United States Patent [19]
Goto et al.

[11] Patent Number: 5,919,381
[45] Date of Patent: Jul. 6, 1999

[54] BIPOLAR ELECTRICAL DISCHARGE MACHINE WHICH DETECTS MISFIRE

[75] Inventors: Akihiro Goto; Mitsuyoshi Wada; Yoshio Ozaki, all of Aichi, Japan

[73] Assignee: Mitsubishi Denki Kabushiki Kaisha, Tokyo, Japan

[21] Appl. No.: 08/881,933

[22] Filed: Jun. 25, 1997

Related U.S. Application Data

[62] Division of application No. 08/267,233, Jun. 29, 1994, Pat. No. 5,753,882.

[30] Foreign Application Priority Data

Jun. 30, 1993 [JP] Japan .................................. 5-162725

[51] Int. Cl.$^6$ ...................................................... B23H 1/02
[52] U.S. Cl. ............................................................ 219/69.18
[58] Field of Search ............................. 219/69.13, 69.18

[56] References Cited

U.S. PATENT DOCUMENTS

| | | | |
|---|---|---|---|
| 3,558,998 | 1/1971 | Bertolasi | 219/69.13 |
| 3,705,286 | 12/1972 | Kondo et al. | 219/69.13 |
| 3,825,715 | 7/1974 | Saito et al. | 219/69.17 |
| 3,892,936 | 7/1975 | Kobayashi et al. | 219/69.18 |
| 3,997,753 | 12/1976 | Inoue | 219/69.13 |
| 4,211,908 | 7/1980 | Niwa | 219/69.18 |
| 4,350,863 | 9/1982 | Inoue | 219/69.18 |
| 4,447,696 | 5/1984 | Niwa | 219/69.18 |
| 4,504,722 | 3/1985 | Kishi et al. | 219/69.13 |
| 4,720,616 | 1/1988 | Inoue | 219/69.18 |
| 4,822,970 | 4/1989 | Levy et al. | 219/69.16 |
| 4,945,199 | 7/1990 | Tanaka et al. | 219/69.13 |
| 5,117,083 | 5/1992 | Kawamura | 219/69.16 |
| 5,187,341 | 2/1993 | Graell | 219/69.18 |
| 5,233,148 | 8/1993 | Magara et al. | 219/69.13 |

(List continued on next page.)

FOREIGN PATENT DOCUMENTS

| | | |
|---|---|---|
| 0488187 | 6/1992 | European Pat. Off. . |
| 0545156 | 6/1993 | European Pat. Off. . |
| 3300552 | 9/1983 | Germany . |
| 3535512 | 4/1986 | Germany . |
| 3117814 | 3/1988 | Germany . |
| 3790717 | 11/1993 | Germany . |
| 53-145195 | 12/1978 | Japan .................................. 219/69.18 |
| 59-93228 | 5/1984 | Japan . |
| 61-50714 | 3/1986 | Japan . |
| 63-102825 | 5/1988 | Japan . |
| 63-200918 | 8/1988 | Japan .................................. 219/69.13 |
| 63-180416 | 7/1989 | Japan .................................. 219/69.18 |
| 3 196916 | 8/1991 | Japan . |
| 3-196916 | 8/1991 | Japan .................................. 219/69.18 |

(List continued on next page.)

OTHER PUBLICATIONS

M. Weck: "Digital adaptive Reglung des Funkenerosionsprozesses (Digital adaptive control of the electrical discharge process)", in VDI–Z, Feb. 2, 1989, No. 2, pp. 39–44.

*Primary Examiner*—Geoffrey S. Evans
*Attorney, Agent, or Firm*—Sughrue, Mion, Zinn, Macpeak & Seas, PLLC

[57] ABSTRACT

An electrical discharge machine for applying a pulsed voltage to a machining gap between an electrode and a workpiece disposed opposite thereto. An insulating dielectric fluid, such as oil or water mixed with a compound additive, is disposed in the gap. A positive polarity voltage and an opposite polarity voltage are applied via switches and respective impedances to the machining gap in order to generate a discharge for machining the workpiece. A pulse having a first polarity is applied to machine the workpiece and a pulse having a second polarity is applied when the first polarity pulse is not applied. A misfire pulse detector detects an undesired drop in the machining voltage by determining whether the first polarity voltage is in a range between two voltages, the first of which has a magnitude greater than the magnitude of the machining gap during discharge and the second of which has a magnitude greater than the magnitude of the first voltage.

2 Claims, 18 Drawing Sheets

U.S. PATENT DOCUMENTS

| | | | |
|---|---|---|---|
| 5,345,053 | 9/1994 | Kaneko et al. | 219/69.18 |
| 5,359,169 | 10/1994 | Kaneko | 219/69.18 |
| 5,399,826 | 3/1995 | Kaneko et al. | 219/69.13 |
| 5,416,290 | 5/1995 | Magara et al. | 219/69.18 |
| 5,422,455 | 6/1995 | Sato et al. | 219/69.13 |
| 5,428,201 | 6/1995 | Kaneko et al. | 219/69.16 |
| 5,453,593 | 9/1995 | Seok-Yong et al. | 219/69.13 |

FOREIGN PATENT DOCUMENTS

| | | | |
|---|---|---|---|
| 3 208520 | 9/1991 | Japan . | |
| 3 239413 | 10/1991 | Japan . | |
| 3-294116 | 12/1991 | Japan | 219/69.18 |
| 4 101722 | 4/1992 | Japan . | |
| 4 331020 | 11/1992 | Japan . | |
| 6-71517 | 3/1994 | Japan | 219/69.17 |
| 92 03246 | 3/1992 | WIPO . | |

BIPOLAR ELECTRICAL DISCHARGE MACHINE WHICH DETECTS MISFIRE

This is a divisional of application Ser. No. 08/267,233, filed Jun. 29, 1994, now U.S. Pat. No. 5,753,882.

BACKGROUND OF THE INVENTION

1. Field of the Invention

The present invention relates to an electrical discharge machine which applies discharge pulses of both polarities to an electrode and a workpiece to machine the workpiece by means of a discharge in electrical discharge machining.

2. Description of the Background Art

Conventionally, since a dielectric fluid made of water and a compound or oil is used in diesinking electrical discharge machining, the tar decomposition of the compound or oil builds up on the machined surface of a workpiece particularly finishing, posing problems of unstable machining, poor machined surface roughness, etc. To solve these problems, there exists a method of temporarily reversing the polarities of the electrode and the workpiece during machining as disclosed in Japanese Laid-Open Patent Publication No. SHO59-93228, Japanese Laid-Open Patent Publication No. HEI3-196916, Japanese Laid-Open Patent Publication No. HEI3-239413, Japanese Laid-Open Patent Publication No. HEI4-101722, etc. Also, an example of a conventional electrical discharge machine using pulses of both polarities is disclosed in Japanese Laid-Open Patent Publication No. HEI3-20852, etc. Further, the control of pulses of both polarities in electrical discharge machining using the pulses of both polarities is described in Japanese Laid-Open Patent Publication No. SHO61-50714.

The methods disclosed in Japanese Laid-Open Patent Publication No. SHO59-93228, Japanese Laid-Open Patent Publication No. HEI3-196916 and Japanese Laid-Open Patent Publication No. HEI3-239413 allow built-up tar to be removed by an opposite polarity discharge. However, the methods disclosed in these publications, wherein voltages at positive polarity (negative electrode, positive workpiece) and opposite polarity (positive electrode, negative workpiece) are judged at proper intervals, have problems in that machining at positive polarity increases electrode consumption generally and machining speed is effected because the machining status is extremely unstable for a while after the reversal of the polarity due to a difference in machining status between the positive and negative polarities.

The method disclosed in Japanese Laid-Open Patent Publication No. HEI4-101722 allows machining parameters to be set separately for positive-polarity machining and opposite-polarity machining in order to reduce electrode consumption to a certain degree, but the method is identical to those disclosed in Japanese Laid-Open Patent Publication No. SHO59-93228, Japanese Laid-Open Patent Publication No. HEI3-196916 and Japanese Laid-Open Patent Publication No. HEI3-239413 in that a workpiece is machined at two polarities, and cannot substantially reduce electrode consumption. Also, if positive polarity machining conditions are lowered to reduce electrode consumption, the machining speed of the workpiece is inevitably reduced during positive polarity machining. Further, especially if the machining current value is decreased (as one of the machining conditions that is lowered), the use of a water-based dielectric fluid has a strong possibility of causing an extremely unstable status which will not raise the voltage and will not generate a proper discharge.

An example of the electrical discharge machine using pulses of both polarities to prevent the deterioration of face roughness due to electrolytic phenomenon is disclosed by Japanese Laid-Open Patent Publication No. HEI3-208520. It is recognized therein that there is a phenomenon wherein the roughness of the machined surface when the electrode is positively energized is made 1.5 to 2.0 times rougher than when the electrode is negatively energized, and hence the total roughness of the surface becomes rougher than that which is obtained when the electrode is positively energized. In order to eliminate these problems, which still remain when pulses of both polarities are used, the voltage of one polarity is set to a value at which discharge occurs, whereas the voltage of opposite polarity is set to a value at which no discharge occurs. However, in order to set the voltage of opposite polarity to a value at which no discharge occurs so that the average voltage between the electrodes drops to 0 or close to 0, it is necessary to increase the period of time during which the voltage of opposite polarity is applied to the electrode; that is, the period of time necessary for applying the voltage of opposite polarity is made longer. As a result, a problem arises because the machining speed is also lowered. Since the electrical discharge machine disclosed in Japanese Laid-Open Patent Publication No. HEI3-208520 is intended to prevent an electrolytic action, a leakage current flowing in the machining gap through the dielectric fluid may be nearly zero on average. However, this system is also not adequate for the prevention of tar build-up because the phenomenon of charged tar being attracted by the voltage of the electrode or workpiece creates a problem.

Furthermore, Japanese Laid-Open Patent Publication No. SHO61-50714 describes the control of pulses of both polarities in electrical discharge machining. This is a method of applying an opposite polarity voltage for a very short time when a discharge is not generated by the application of a pulsed voltage. This publication also describes a method of increasing the voltage and time for applying a low-level pulse of the opposite polarity voltage when the discharge does not take place. However, merely applying a pulse for a very short time cannot drop the average voltage sufficiently and the average voltage of 18V provided by this machine has almost no effect on the prevention of tar build-up. Since this machine is also intended to prevent an electrolytic action, a leakage current flowing in the machining gap through a dielectric fluid may be nearly zero on average. However, this system is not adequate for the prevention of tar build-up because the charged tar is attracted by the voltage of the electrode or workpiece. Also, the method of increasing the voltage and time of a low-level pulse of opposite polarity voltage applied when the discharge does not take place is useless because the non-occurrence of a discharge is totally irrelevant to the stability or instability of the discharge status. Since a discharge does not occur mainly because the electrode and workpiece are away from each other, the detection of the discharge status to control machining conditions does not produce an effect on the improvement of machining performance.

To summarize diesinking electrical discharge machine generally employs oil or a mixture of water and a high molecular compound as a dielectric fluid. When this dielectric fluid is used for electrical discharge machining, the oil or compound is decomposed to generate tar. This tar, which has been charged, builds up on the electrode in the dielectric fluid of the oil or on the workpiece in the dielectric fluid made of the mixture of water and a high molecular compound, posing problems of unstable machining and poor machined surface roughness. To prevent the charged tar from building up on the electrode or the workpiece, the workpiece was conventionally machined with a voltage of opposite polarity. However, this method presented a machining speed problem and also a problem of increased electrode consumption because low electrode consumption conditions cannot be maintained if the polarity is switched for machining. Also, conventionally there were no measures for the detection method, machining condition control, etc., of unstable machining which was the cause of tar build-up.

The research of the inventors revealed the following three facts. First, controlling the average voltage of the machining gap to nearly 0V is effective for preventing the charged tar from building up on the electrode or workpiece. Second, surface quality is enhanced not only by making the average voltage 0V but also by causing a slight discharge at opposite polarity. It should be noted that the machining current must be reduced for machining at positive polarity (negative electrode, positive workpiece) because of its high electrode consumption rate. Third, when machining has become unstable due to tar building up on the electrode or workpiece, rendering the average voltage of the machining gap to 0V returns the machining to a stable status immediately in as short as several seconds. To increase the machining speed, therefore, it is effective to increase the stop time, i.e., the time when a positive polarity voltage is applied, to cause the average voltage of the machining gap to approach 0V on detection of instability while the workpiece is being machined with the duty factor of the opposite polarity increased.

SUMMARY OF THE INVENTION

An object of the present invention is to provide an electrical discharge machine which can suppress tar build-up on the basis of these facts and which can also suppress electrode consumption.

Another object of the present invention is to provide an electrical discharge machine which can suppress tar build-up and which can also prevent the electrolytic corrosion of a workpiece.

Another object of the present invention is to provide an electrical discharge machine which can suppress tar build-up on the basis of these facts and which can also stabilize machining and suppress the reduction of machining speed.

A further object of the present invention is to provide an electrical discharge machine which is equipped with a novel tar build-up detector.

DESCRIPTION OF THE PREFERRED EMBODIMENTS

EMBODIMENT 1

Figure 1:
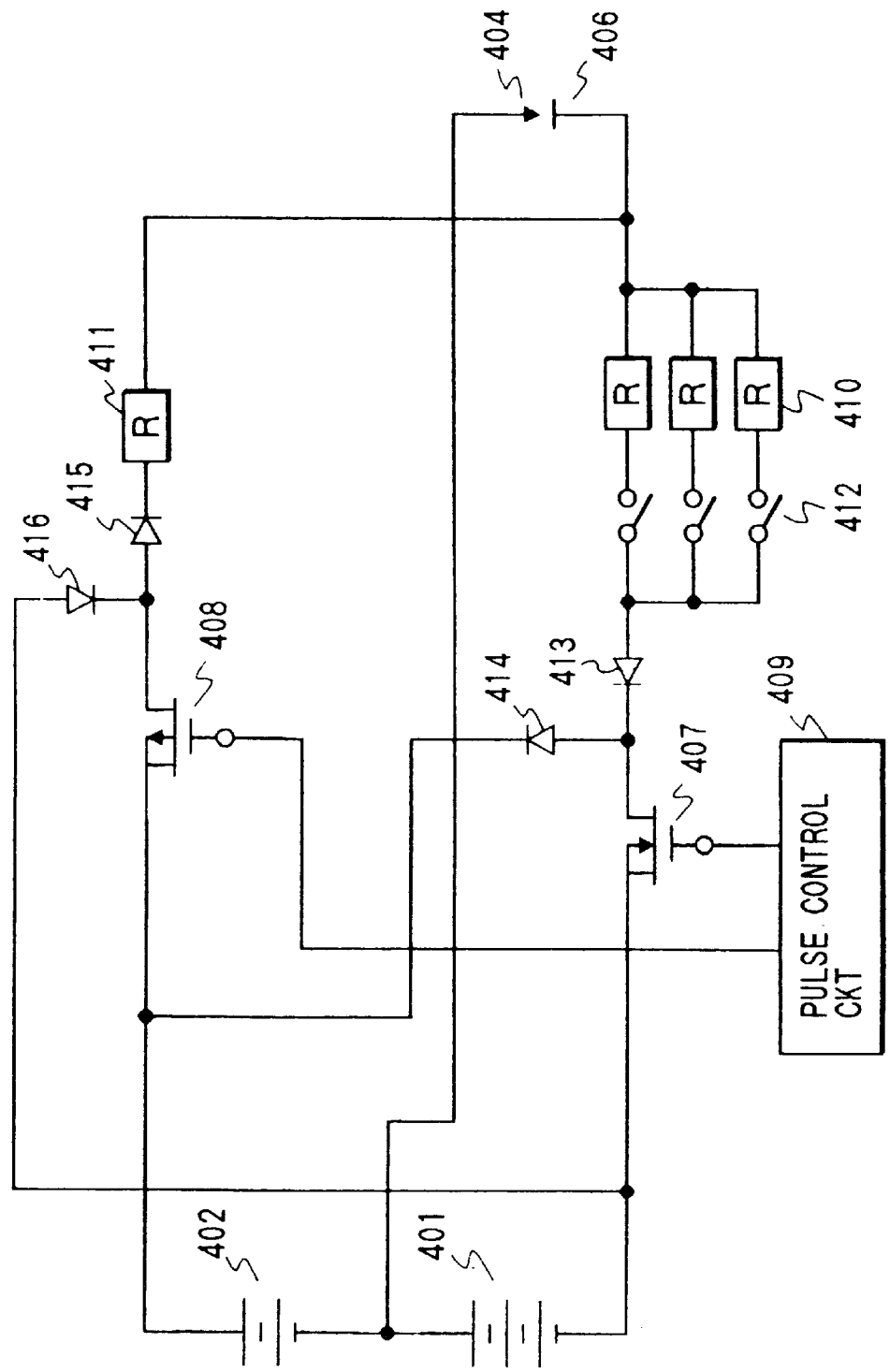
FIG. 1 is a block diagram illustrating a preferred embodiment of the invention.

FIG. 1 is a block diagram showing a first embodiment of the invention. It is to be understood that this embodiment is a preferred embodiment wherein an insulating dielectric fluid is used.

Figure 2:
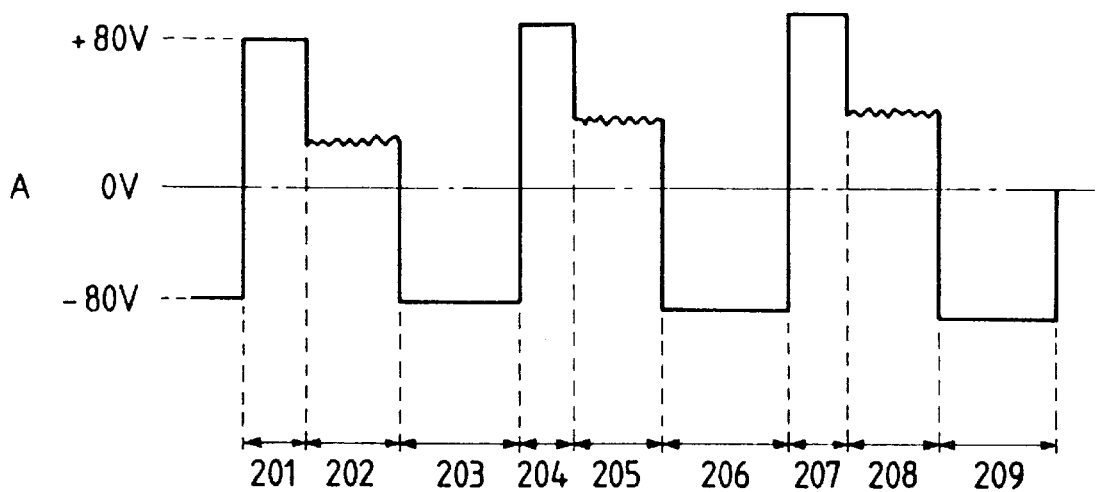
FIG. 2 is a voltage waveform diagram used to show the operation of the preferred embodiment of the invention.

In FIG. 1, the numeral 401 indicates a direct-current power supply for an opposite polarity (approximately +80V), 402 denotes a direct-current power supply for a positive polarity (approximately −80V), 404 represents an electrode, 406 designates a workpiece, 407 indicates a switching device for opposite polarity, 408 denotes a switching device for positive polarity, 409 designates a pulse control circuit, 410 represents current limit resistors for opposite polarity, and 411 indicates a current limit fixed resistor for positive polarity which has a large value of not less than 5 ohms at which a discharge is unlikely to occur. Element 412 indicates opposite polarity current limit resistor change-over switches, and 413, 414, 415 and 416 represent diodes. FIG. 2 shows a machining gap voltage waveform in for the first embodiment of the invention, wherein polarity is defined as positive when the electrode 405 is positive and the workpiece 406 is negative. In this drawing, 201, 204 and 207 designate no-load time periods at opposite polarity, and 202, 205 and 208 denote discharge time periods at opposite polarity having a set pulse width. In addition, 203, 206 and 209 indicate stop time periods at opposite polarity, at which time a positive polarity voltage is applied. The positive polarity voltage application time represents the stop time of an applied opposite polarity voltage. To determine when the voltage is applied during the stop time, a positive polarity voltage application controlling method in each embodiment can be employed. In the present embodiment, the positive polarity voltage is applied to ensure that the average voltage is 0V or nearly 0V throughout the stop time of the opposite polarity voltage.

The operation is performed as follows. In the pulse control circuit 409 shown in FIG. 1, the gate signals of the switching devices 407, 408 are made. In waveform A shown in FIG. 2, timings 201, 202, 204, 205, 207, 208 represent timings when the switching device 407 is turned on, while timings 203, 206, 209 represent timings when the switching device 408 is turned on. An opposite polarity current value can be changed by switching between the opposite polarity current limit resistors 410 by means of the opposite polarity current limit resistor change-over switches. Element 412 is used in an ordinary electrical discharge machine. When a substantially-insulating dielectric fluid such as oil is used, the positive polarity current limit resistor 411 is fixed at a large value of not less than 5 ohms to reduce the influence of a positive polarity discharge and to provide a good surface quality for the workpiece due to a slight discharge at positive polarity. Since the insulating fluid used as a dielectric fluid does not cause a current to leak by the application of a voltage across the machining gap unless a discharge occurs, the positive polarity current limit resistor 411 can be fixed to a large value and need not be switched. Generally, when a copper electrode or a graphite electrode is used to machine steel, electrode consumption can be lowered at opposite polarity and consumption occurs at positive polarity. Accordingly, the build-up of tar on the electrode or workpiece can be suppressed and the decrease of metal removal by means of positive polarity discharge reduces the influence on electrode consumption, providing good surface quality for the workpiece.

EMBODIMENT 2

Figure 3:
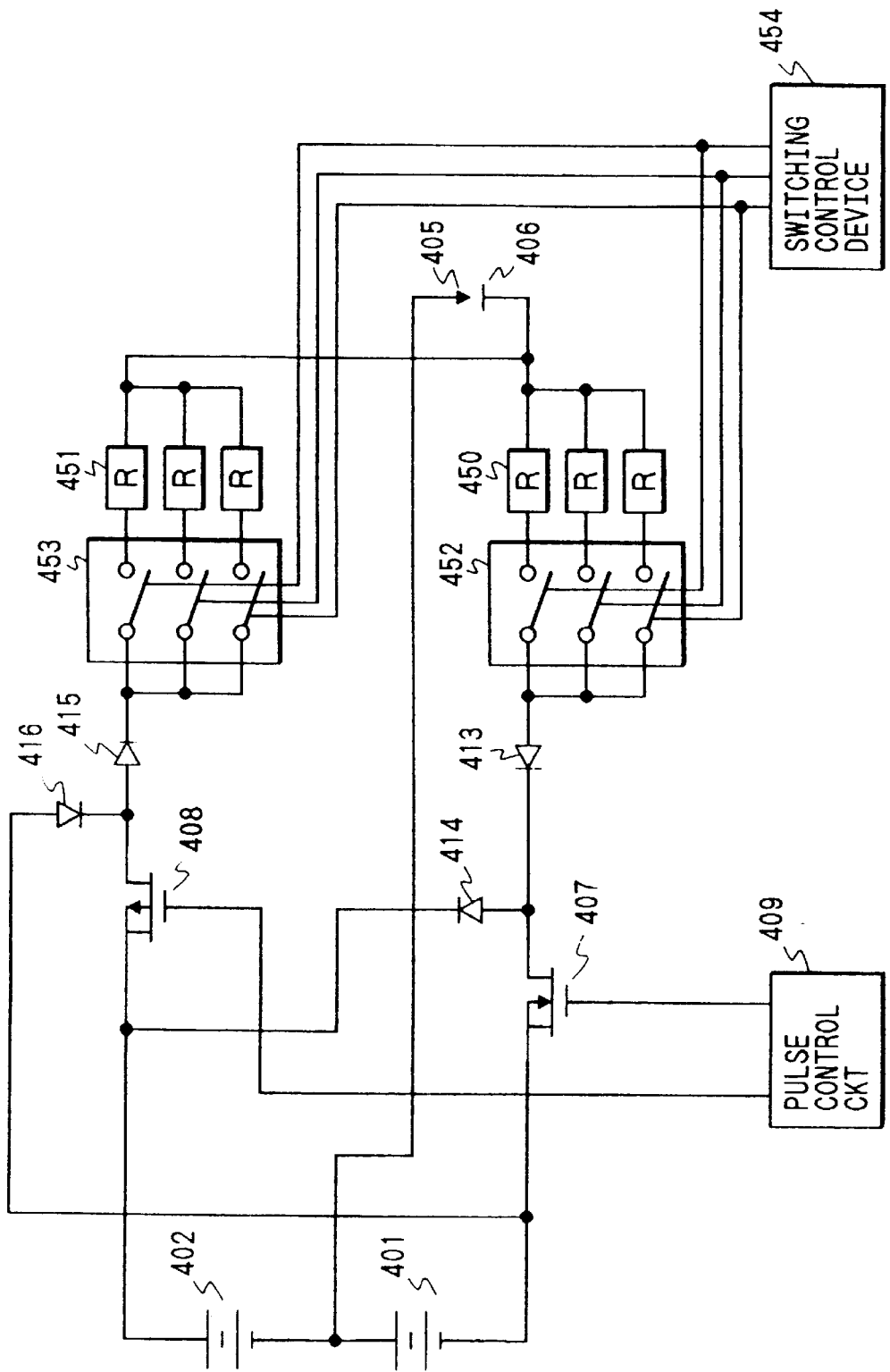
FIG. 3 is a block diagram illustrating a second preferred embodiment of the invention.

FIG. 3 is a block diagram showing a second embodiment of the invention. It is to be understood that this embodiment is a preferred embodiment wherein a dielectric fluid made of water and a compound is employed as a dielectric fluid.

In FIG. 3, 450 indicates opposite polarity current limit resistors, 451 denotes positive polarity current limit resistors, 452 designates opposite polarity current limit resistor change-over switches, 453 represents positive polarity current limit resistor change-over switches, 454 indicates a switching control device which causes the opposite polarity current limit resistor change-over switches 452 and the positive polarity current limit resistor change-over switches 453 to be operated jointly and switched therebetween, and 413 to 416 represent diodes.

The operation occurs as follows. The opposite polarity current limit resistor change-over switches 452 are operated to switch between the opposite polarity current limit resistors 450, and jointly with this switching, the positive polarity current limit resistor change-over switches 453 are operated to switch between the positive polarity current limit resistors 451. When a dielectric fluid made of water and another compound is used, a leakage current flows in the machining gap to cause a drop in applied voltage. Hence, if the resistivity of the dielectric fluid is low or if the machined area is large, a no-load voltage falls and does not rise up to a set voltage. If the positive polarity current limit resistor is fixed to a large value as in Embodiment 1, the reduction in dielectric fluid resistivity or the increase in machined area will decrease the positive polarity voltage and the average voltage of the machining gap cannot be reduced. However, when the positive polarity current limit resistance is decreased, a problem of increased electrode consumption arises. Therefore, the positive polarity current limit resistors 451 must always be changed to an appropriate value jointly with the opposite polarity current limit resistors. In a preferred example, the current limit impedance of the positive polarity is about twice as great as that of the opposite polarity.

It is to be noted that also in this embodiment, the average voltage is preferably controlled to approximately 0V and a slight discharge caused at the application of the positive polarity voltage provides the workpiece with good surface quality.

EMBODIMENT 3

Figure 4:
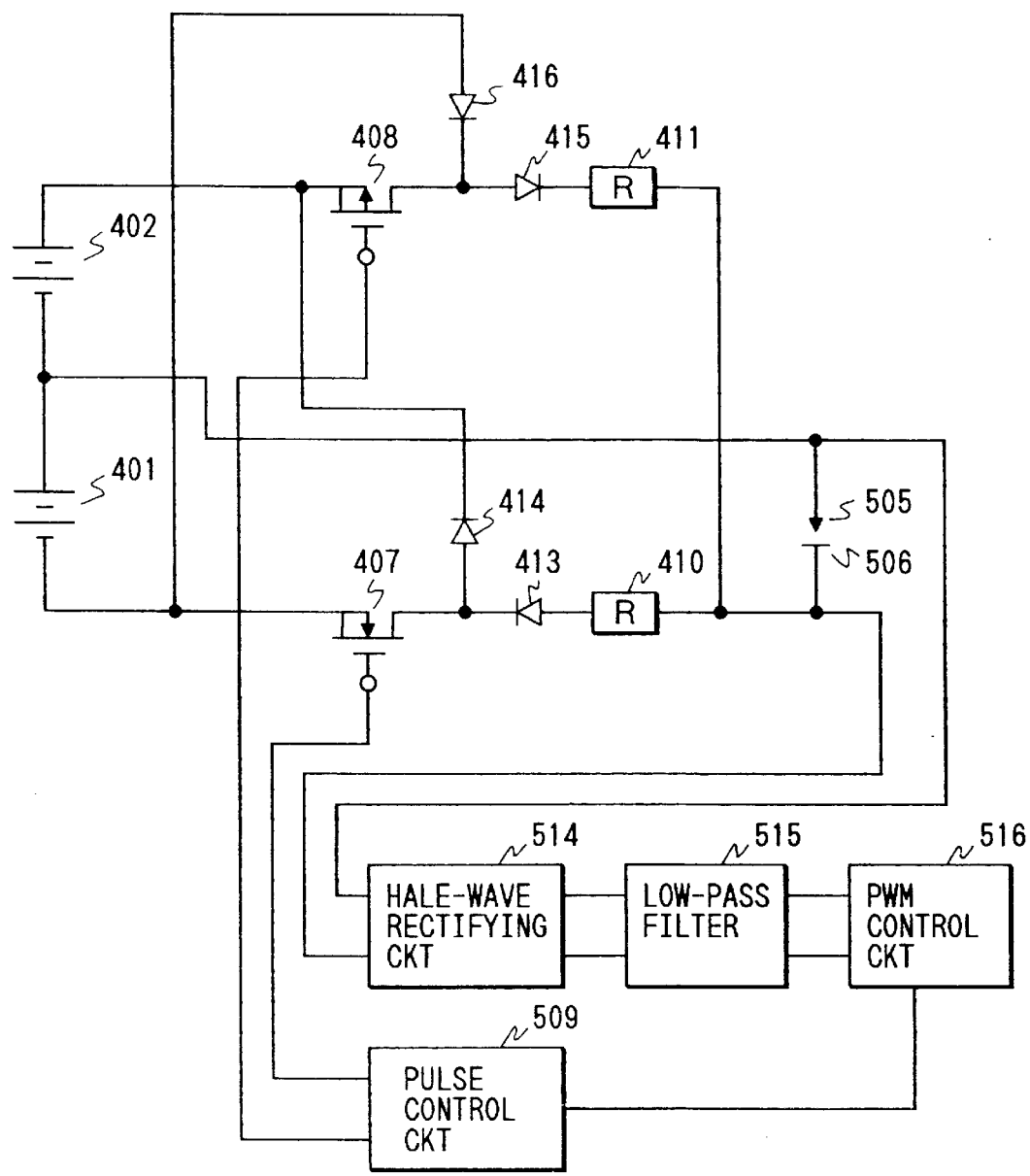
FIG. 4 is a block diagram illustrating a third preferred embodiment of the invention.

FIG. 4 is a block diagram showing a third embodiment of the invention. In the drawing, 505 indicates an electrode, 506 represents a workpiece, 514 designates a half-wave rectifying circuit which fetches a voltage across the electrode 505 and the workpiece 506 when the electrode 505 is positive, 515 denotes a low-pass filter of 10 kHz cut-off frequency, 516 indicates a PWM control circuit, 509 denotes a pulse control circuit, and 413 to 416 designate diodes.

The operation is performed as follows. In the circuit of FIG. 4, the discharge time and stop time of the opposite polarity voltage are repeated periodically at set intervals by the pulse control circuit 509. The application time of the voltage applied to the positive polarity side at the opposite polarity stop time is then controlled to keep the average voltage of the machining gap at a set value. The half-wave rectifying circuit 514 fetches a voltage on the opposite polarity side of the machining gap, a voltage at a time when the electrode is positive. Subsequently, that voltage passes through and is smoothed by the 10 kHz low-pass filter 515, i.e., the voltage is smoothed at intervals of 100 μsec. This voltage is then employed in the PWM control circuit 516 to exercise PWM control and the positive polarity voltage is applied to the machining gap through the pulse control circuit 509 so that the average voltage of the machining gap reaches a set value, e.g., 0V.

Figure 5:
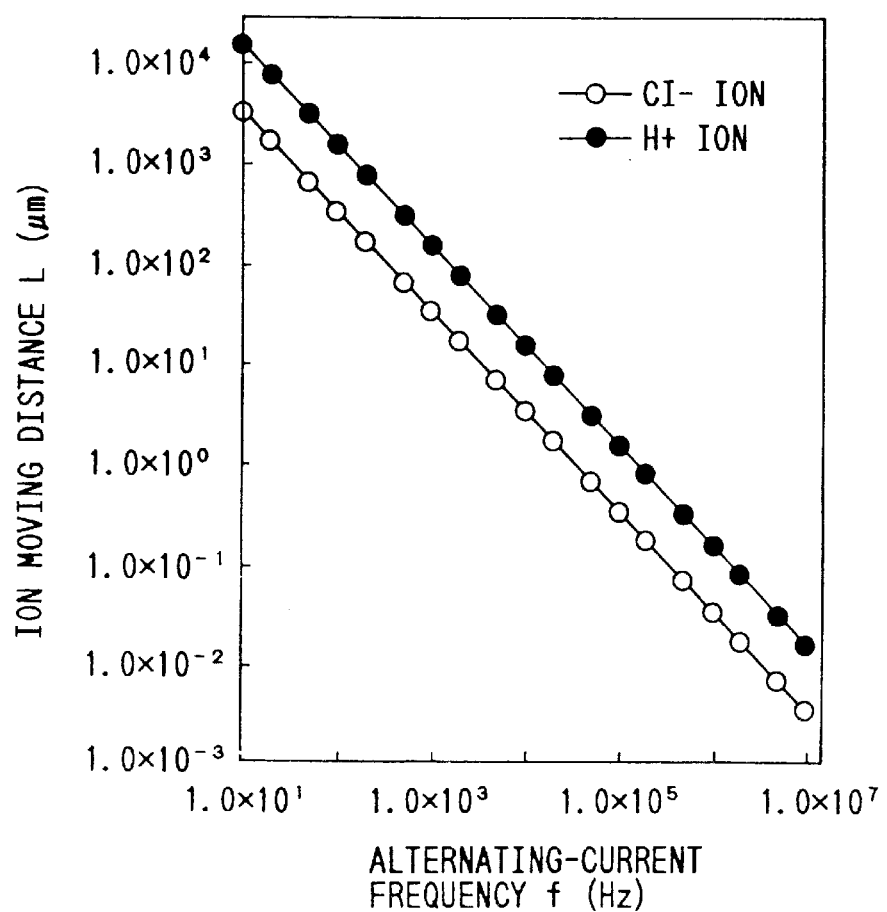
FIG. 5 is a graph which plots the ion moving distance versus the polarity characteristic in order to show the operation of the third preferred embodiment of the invention.

When a voltage is applied to the machining gap, a positive voltage is more likely to cause electrolytic corrosion. When an alternating-current voltage is applied to the machining gap, the likelihood of electrolytic corrosion changes according to the frequency of the alternating-current voltage. FIG. 5 is a graph which illustrates a relationship between alternating-current frequency and the ion moving distance. This graph shows that a distance over which ions can move during a period of time until the alternating-current polarity changes is approximately several mm at the frequency of 10 Hz and falls to not more than 10 μm at the frequency of 10 kHz. The minimum machining gap distance in electrical discharge machining is several ten μm (less than 100 μm), so that electrolytic corrosion can be prevented at the frequency of 10 kHz or higher. To prevent electrolytic corrosion, therefore, the average voltage must be controlled at given intervals of not more than 100 μsec.

Also, to prevent the electrolytic corrosion of the workpiece 506, the average voltage must be 0V or higher with the electrode 505 being positive.

EMBODIMENT 4

Figure 6:
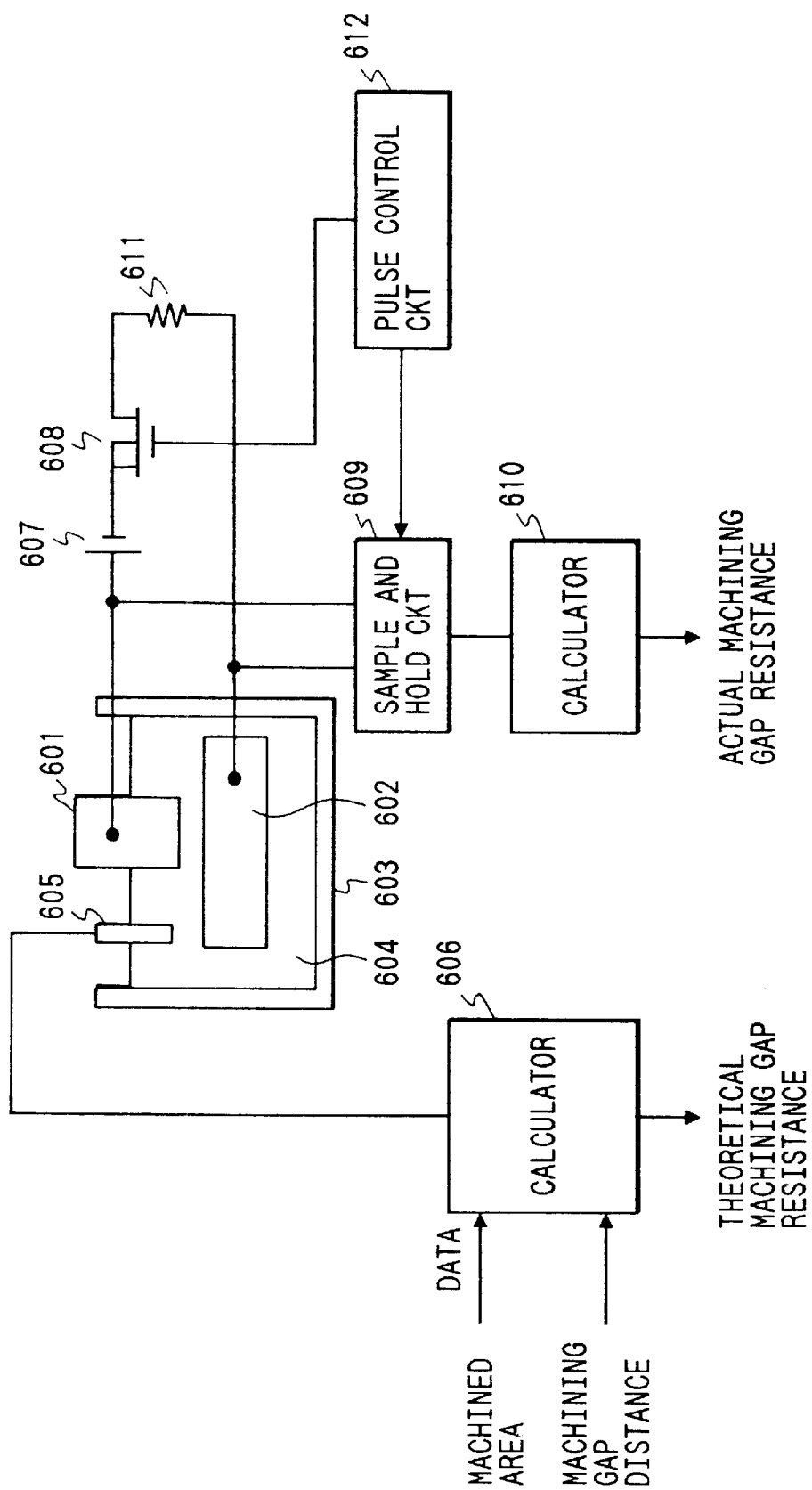
FIG. 6 is a block diagram illustrating a forth preferred embodiment of the invention.

FIG. 6 is an arrangement diagram showing a fourth embodiment of the invention. In the drawing, 601 indicates an electrode, 602 designates a workpiece, 603 denotes a machining bath, 604 represents a dielectric fluid, 605 indicates a dielectric fluid resistivity measuring device, 606 denotes a calculator which calculates theoretical machining gap resistance from data such as the result of the resistivity measuring device 605, a machined area and a machining gap distance, 607 represents a direct-current power supply, 608 designates a direct-current power supply switching device, 609 indicates a sample and hold circuit, 610 represents a calculator which calculates actual machining gap resistance from the result of the sample and hold circuit 609 and the voltage value of the direct-current power supply 607, 611 designates a resistor, 612 denotes a pulse control circuit which determines the operation timings of the direct-current power supply switching device 608 and the sample and hold circuit 609. It will be recognized that the calculator 606 and the calculator 610 may be replaced by a single calculator.

The operation is performed as follows. First, a method of measuring the theoretical machining gap resistance will be described. The resistivity of the dielectric fluid 604 can be measured by the resistivity measuring device 605. Since the machining gap distance is given by machining conditions, the resistance value of the machining gap is found by the expression of (dielectric fluid resistivity)×(machining gap distance)/(machined area) if the machined area and dielectric fluid resistivity are given. In the meantime, the actually measured value of the machining gap resistance is found in the following method. A voltage is applied to the machining gap by the power supply 607 and the machining gap voltage is measured. The timing of applying the voltage to the machining gap and the timing of sampling the voltage are determined by the pulse control circuit 612, the machining gap voltage at the application of the voltage is sampled and held by the sample and hold circuit 609, and that value is sent to the calculator 610. Assuming that the voltage of the power supply 607 is E, the resistance of the resistor 611 is R1, the resistance of the machining gap is R2, and the measured value of the sample and hold circuit 609 is V, $V = E \times R2/(R1+R2)$ is established and therefore $R2 = R1 \times V/(E-V)$ is found. Since tar that has built up in the machining gap is different in resistance value from the dielectric fluid, it can be judged that tar has built up in the machining gap when a difference between the theoretical machining gap resistance and the actually measured machining gap resistance has increased. In particular, it is judged that tar has built up at the time when the actually measured resistance is 30 to 50% or less of the theoretical resistance.

EMBODIMENT 5

Figure 7:
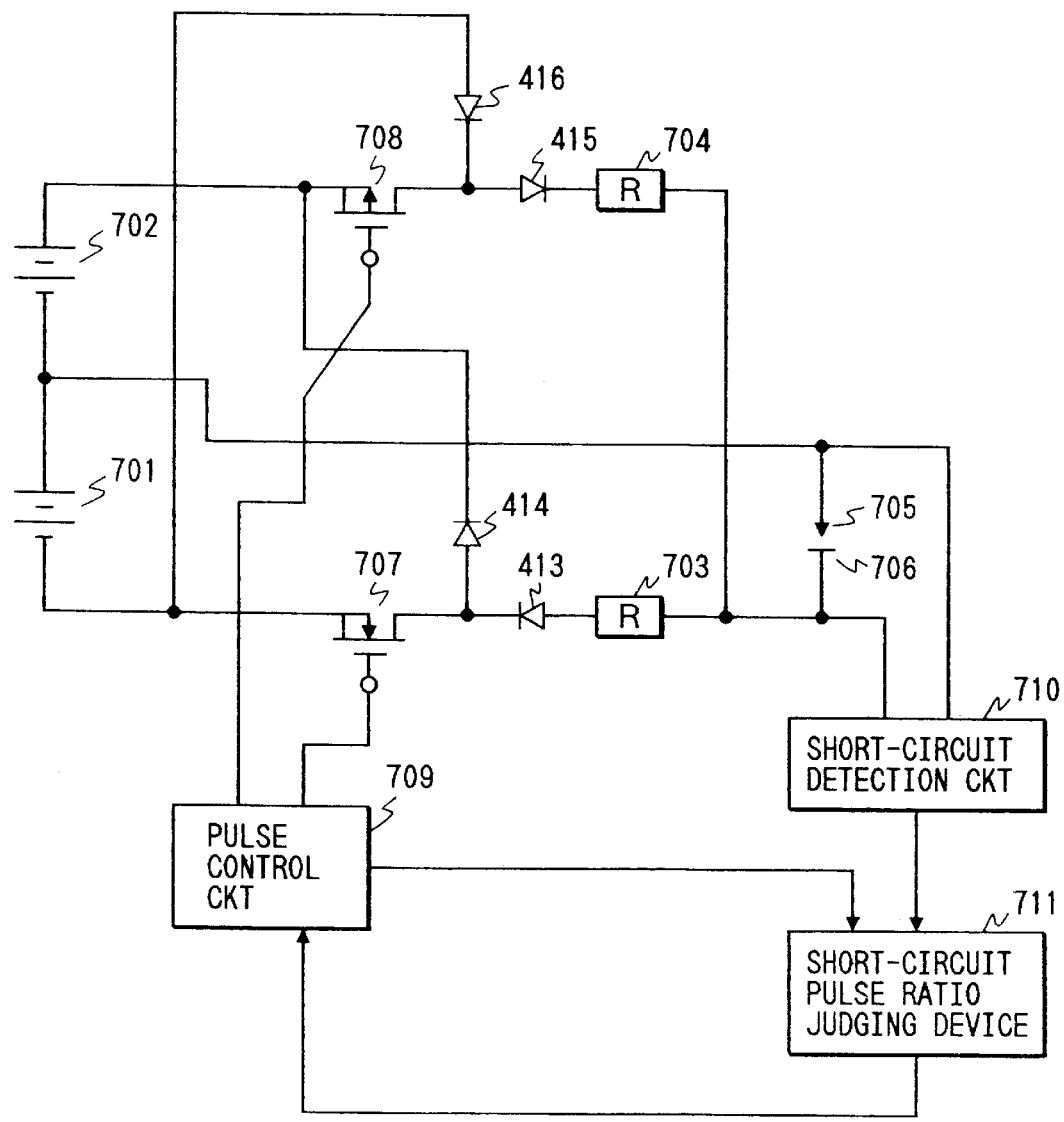
FIG. 7 is a block diagram illustrating a fifth preferred embodiment of the invention.

FIG. 7 is a block diagram showing a fifth embodiment of the invention. In the drawing, 701 indicates a direct-current power supply (approximately +80V) for opposite polarity (positive electrode, negative workpiece), 702 denotes a direct-current power supply (approximately −80V) for positive polarity (negative electrode, positive workpiece), 703 represents an opposite polarity current limit resistor, 704 designates a positive polarity current limit resistor, 705 represents an electrode, 706 designates a workpiece, 707 indicates an opposite polarity switching device, 708 denotes a positive polarity switching device, 709 designates a pulse control circuit, 710 represents a short-circuit detection circuit, 711 indicates a short-circuit pulse ratio judging device, and 413 to 416 represent diodes.

Figure 8:
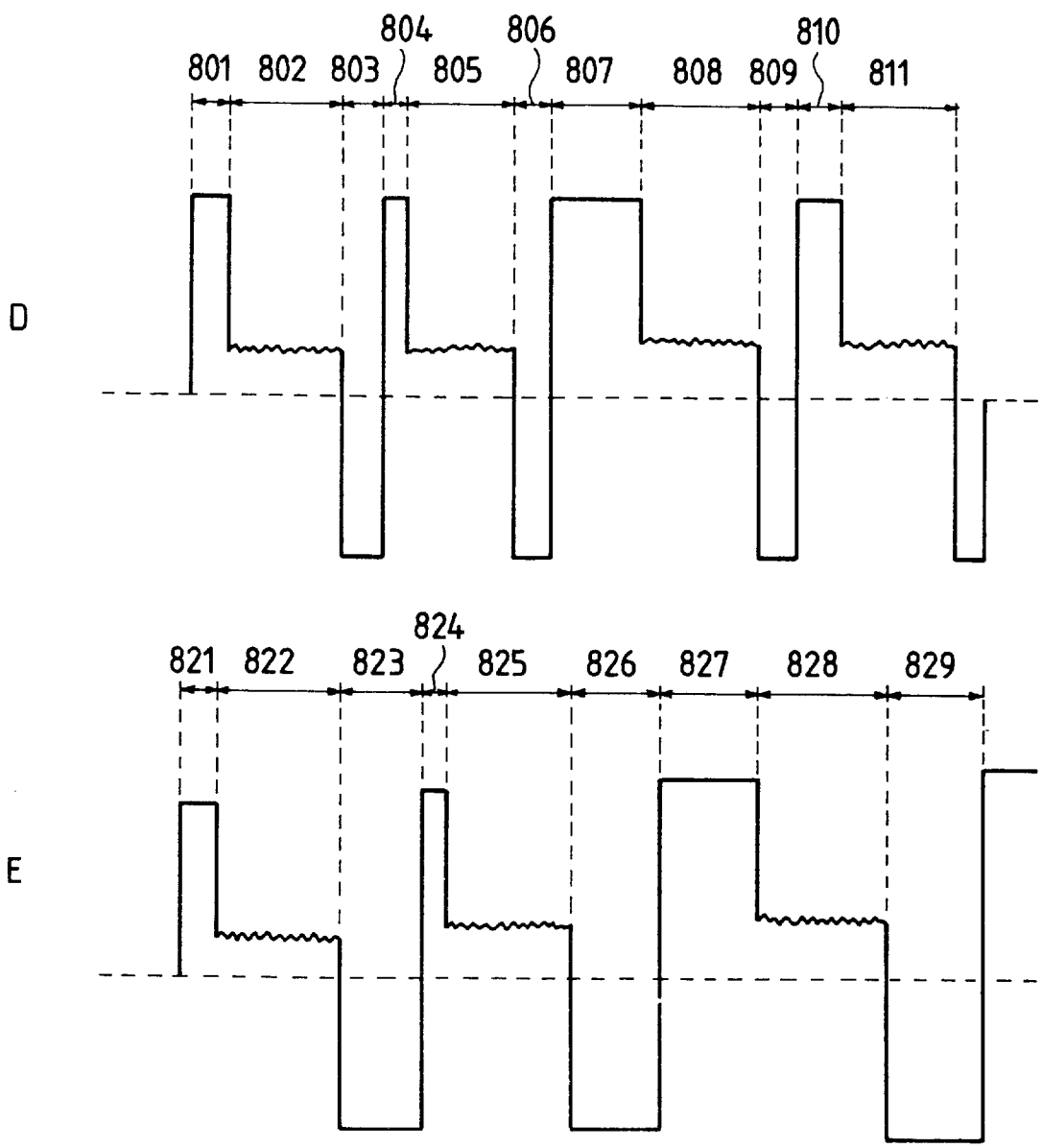
FIG. 8 is a voltage waveform diagram used to describe the operation of the fifth preferred embodiment of the invention.

This operation will be described with reference to the voltage waveform diagram in FIG. 8. In the drawing, D indicates a machining gap voltage waveform at a time when the stop time of the opposite polarity voltage is short, and E represents a machining gap voltage waveform at a time when the stop is longer than in D. Segments 801, 804, 807, 810, 821, 824 and 827 denote opposite polarity no-load time periods. The no-load time differs between discharge pulses and cannot be maintained at a fixed value. Segments 802, 805, 808, 811, 822, 825 and 828 designate opposite polarity discharge time periods which are set as appropriate. In addition, segments 803, 806 and 809 indicate stop time periods, indicating when the stop time of the opposite polarity voltage is short, during which time the positive polarity voltage is applied. Segments 823, 826 and 829 represent opposite polarity voltage stop time periods when the stop is increased. If short-circuit pulses do not occur during machining and machining progresses stably in D where the opposite polarity voltage stop time is short, it is needless to say that the machining speed is higher in D than in E where the stop is increased, because the number of discharge pulses is larger in D than in E (as the stop time is shorter). However, in D where the opposite polarity voltage stop time is short, the time when the voltage is applied to the positive polarity side decreases, whereby the average voltage cannot be reduced. When the average voltage is high, tar builds up on the machined surface gradually, causing a short circuit. Hence, by detecting a short circuit, increasing the opposite polarity voltage stop time as in E, and dropping the average voltage to 0V or nearly 0V, tar floats in dielectric fluid and flows out together with machining fluid which is always supplied, so that tar can be removed from the machined surface to stabilize machining again. While the machining is stable, machining speed is higher under the condition of a short stop time, but under this condition, tar is likely to build on the machined surface and the machining cannot be kept continued after a long period of machining. Therefore, before machining is stopped as described above, a short circuit is detected as a premonitory phenomenon and tar is removed to permit high-speed machining.

For this purpose, a short circuit in the machining gap is detected by the short-circuit detection circuit 710 and a short-circuit pulse ratio is calculated by the short-circuit pulse ratio judging device 711 using information on the total number of pulses applied from the pulse control circuit 709 and information on short-circuit pulses from the short-circuit detection circuit 710. If the short-circuit pulse ratio is over, for e.g., 10%, a signal is given to the pulse control circuit 709 to increase the opposite polarity voltage stop time and increase the positive polarity voltage application time, thereby dropping the average voltage to 0V or nearly 0V.

EMBODIMENT 6

Figure 9:
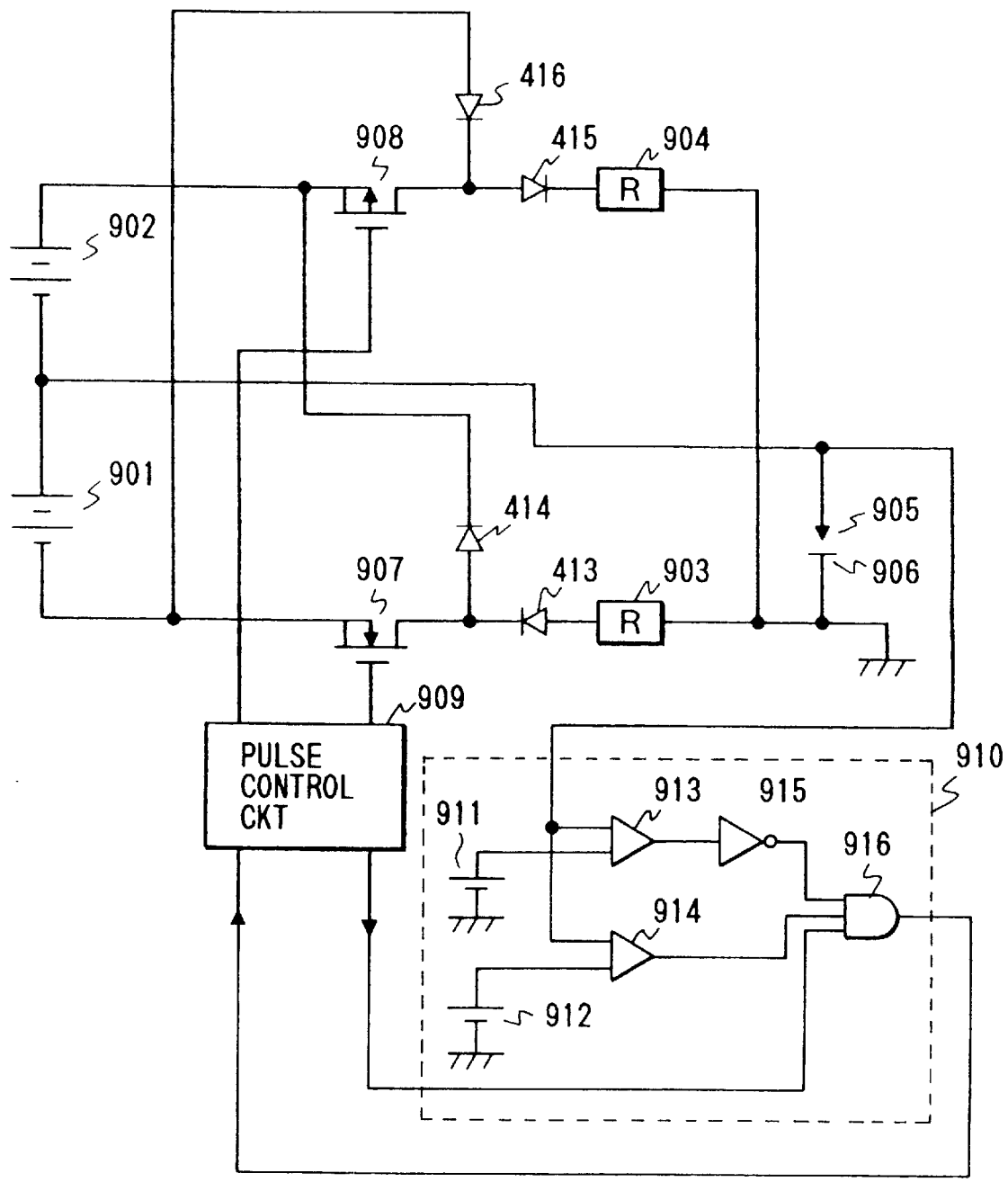
FIG. 9 is a block diagram illustrating a sixth preferred embodiment of the invention.

FIG. 9 is a block diagram showing a sixth embodiment of the invention. In the drawing, 901 indicates a direct-current power supply (approximately +80V) for opposite polarity (positive electrode, negative workpiece), 902 denotes a direct-current power supply (approximately −80V) for positive polarity (negative electrode, positive workpiece), 903 represents an opposite polarity current limit resistor, 904 designates a positive polarity current limit resistor, 905 represents an electrode, 906 designates a workpiece, 907 indicates an opposite polarity switching device, 908 denotes a positive polarity switching device, 909 designates a pulse control circuit, 910 represents a misfire pulse detection circuit, 911 indicates a first direct-current power supply, 912 denotes a second direct-current power supply which is lower in voltage than the first direct-current power supply, 911, 913 and 914 designate comparators, 915 indicates a NOT circuit, 916 denotes an AND circuit, and 413 to 416 represent diodes.

The operation is performed as follows. When the machining gap is stained with tar and/or sludge or the resistivity of the dielectric fluid lowers, the machining gap voltage does not rise to a set voltage. Generally in electrical discharge machining, the occurrence of a discharge is detected by the fall in machining gap voltage. Hence, a voltage drop due to a stain cannot be differentiated from discharge occurrence and the voltage is stopped after a set pulse width. This phenomenon is hereinafter referred to as the generation of a "misfire pulse". When tar builds up in the machining gap, the misfire pulse phenomenon takes place. Generally, a threshold voltage value for the detection of discharge occurrence is about 60V and the machining gap voltage during discharge is about 25V. When the machining gap voltage drops below the threshold value due to the stained machining gap, a misfire pulse occurs and the voltage at this time may reduce to 20V or so according to the degree of the stain. If the machining gap is so stained that the machining gap voltage has dropped to as low as the discharge voltage, a discharge cannot be differentiated from a misfire pulse. However, in a stage prior to said status, i.e., in the misfire pulse state at the voltage of between about 60V and 30V, the misfire pulse state can be detected. While the machining proceeds stably, machining speed is higher under the condition of a short stop time, but under this condition, tar is likely to build on the machined surface and the machining cannot be continued after a long time of machining. Therefore, before machining is stopped as described above, a misfire pulse is detected as a premonitory phenomenon and tar is removed to permit high-speed machining.

For this purpose, the misfire pulse is detected by the misfire pulse detection circuit 910 and the opposite polarity voltage stop time and the positive polarity voltage application time are increased by the pulse control circuit 909 to reduce the average voltage of the machining gap to 0V or nearly 0V. By lowering the average voltage, tar floats in the machining fluid and flows out together with the machining fluid which is always supplied, so that the tar can be removed to stabilize the machining.

EMBODIMENT 7

Figure 10:
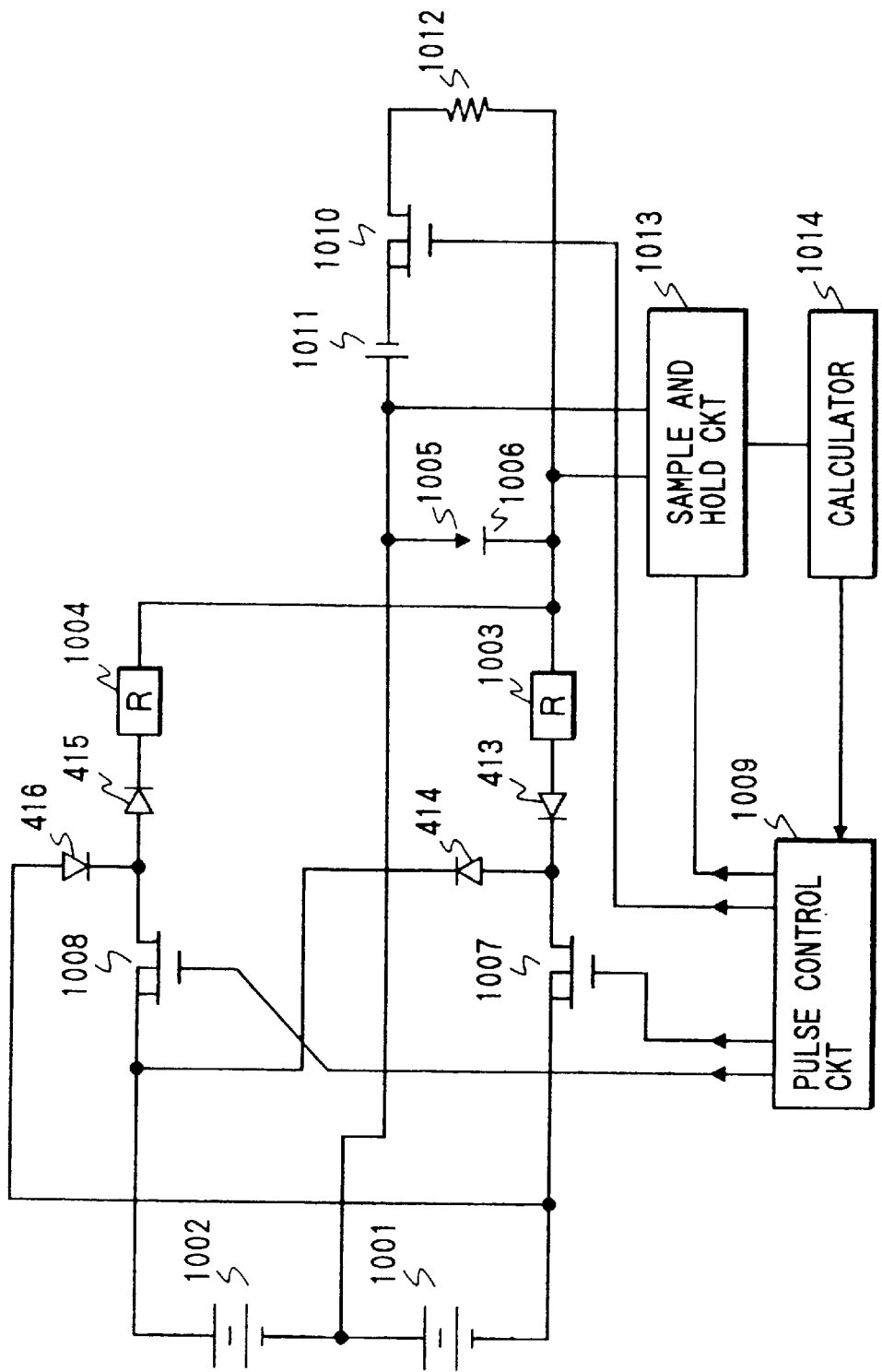
FIG. 10 is a block diagram illustrating a seventh preferred embodiment of the invention.

FIG. 10 is a block diagram showing a seventh embodiment of the invention. In the drawing, 1001 indicates a direct-current power supply (approximately +80V) for opposite polarity (positive electrode, negative workpiece), 1002 denotes a direct-current power supply (approximately −80V) for positive polarity (negative electrode, positive workpiece), 1003 represents an opposite polarity current limit resistor, 1004 designates a positive polarity current limit resistor, 1005 represents an electrode, 1006 designates a workpiece, 1007 indicates an opposite polarity switching device, 1008 denotes a positive polarity switching device, 1009 designates a pulse control circuit, 1010 represents a switching device, and 1011 indicates a direct-current power supply for measuring the machining gap impedance, which is connected to apply an opposite polarity voltage to the machining gap. Here, 1012 denotes a resistor, 1013 indicates a sample and hold circuit, 1014 denotes a calculator which calculates a machining gap impedance from the output of the sample and hold circuit 1013 and provides a signal to the pulse control circuit 1009 according to the result of calculation, and 413 to 416 represent diodes.

The operation is performed as follows. When the machining gap is stained with tar and/or sludge or the resistivity of the dielectric fluid lowers, the machining gap impedance reduces. When the machining gap impedance goes down, a discharge is unlikely to occur. Therefore, the machining impedance lowered must be detected to recover the impedance. During the stop time of the opposite polarity pulse, the machining gap impedance measuring switching device 1010 is turned on by the pulse control circuit 1009 instead of the positive polarity switching device 1008 (which is turned on by the pulse control circuit 1009 periodically), and the machining gap voltage at that time (opposite polarity voltage supplied by the machining gap impedance measuring power supply 1011) is sampled and held by the sample and hold circuit 1013 at the timing of the signal output to the sample and hold circuit 1013 while the switching device 1010 is kept on by the pulse control circuit 1009. Then, the expression of Vg=rE/(r+R) (where, Vg=machining gap voltage sampled and held, r=machining gap impedance, E=given voltage value of the machining gap impedance measuring power supply 1011, R=given resistance value of the resistor 1012) is employed to calculate the machining gap impedance r by means of the calculator 1014, and if the machining gap impedance has dropped below a predetermined value as a result, the signal is provided to the pulse control circuit 1009 to increase the opposite polarity voltage stop time and increase the positive polarity voltage application time, thereby lowering the average machining gap voltage to 0V or nearly 0V. By reducing the average voltage, tar can be removed to increase the machining impedance.

EMBODIMENT 8

Figure 11:
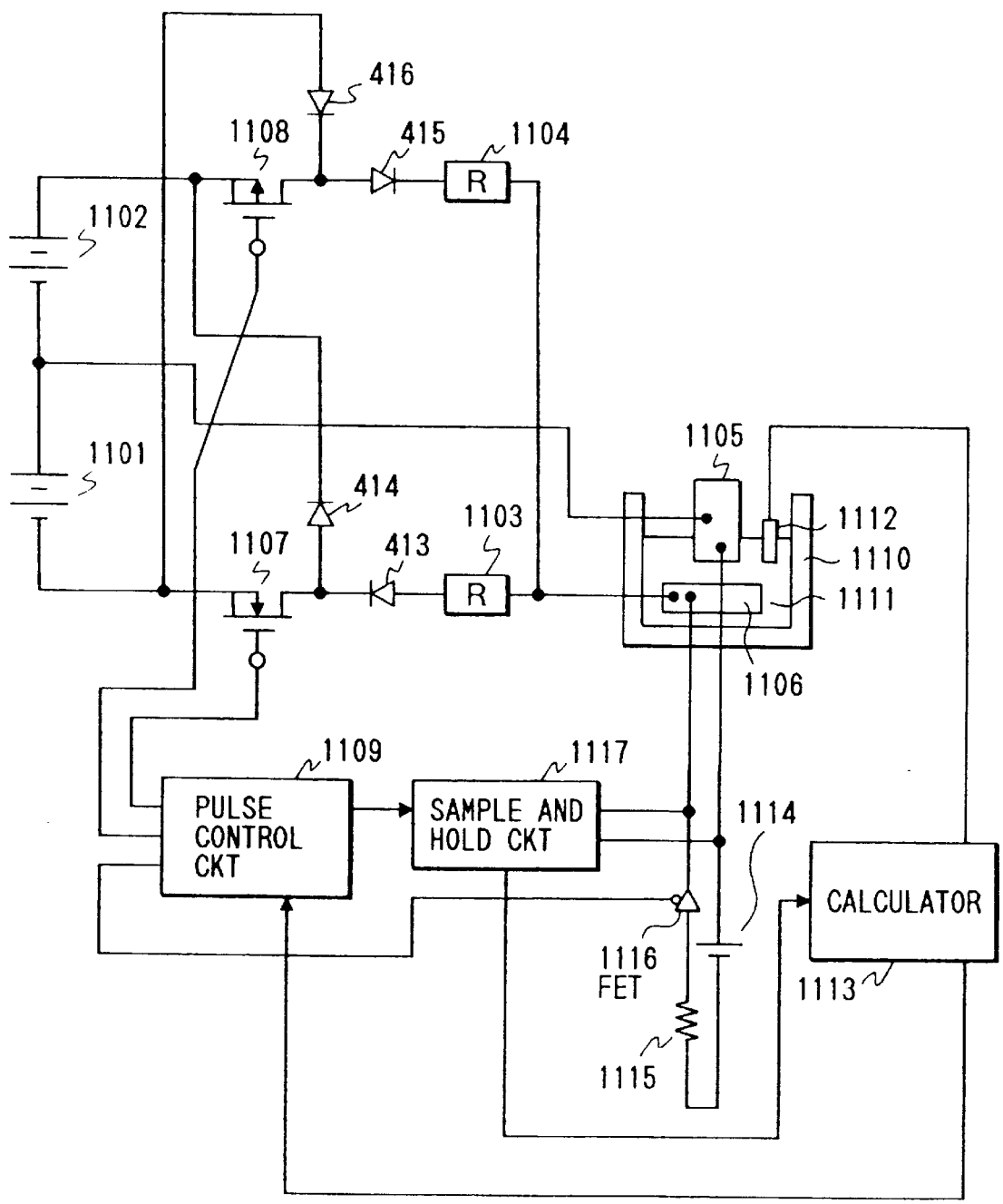
FIG. 11 is a block diagram illustrating an eighth preferred embodiment of the invention.

FIG. 11 is a block diagram showing an eighth embodiment of the invention. In the drawing, 1101 indicates a direct-current power supply (approximately +80V) for opposite polarity (positive electrode, negative workpiece), 1102 denotes a direct-current power supply (approximately −80V) for positive polarity (negative electrode, positive workpiece), 1103 represents an opposite polarity current limit resistor, 1104 designates a positive polarity current limit resistor, 1105 represents an electrode, 1106 designates a workpiece, 1107 indicates an opposite polarity switching device, 1108 denotes a positive polarity switching device, 1109 designates a pulse control circuit, 1110 represents a machining bath, 1012 indicates a resistivity meter, 1113 indicates a calculator, 1114 denotes a direct-current power supply, 1115 designates a resistor, 1116 represents a switching device, 1117 indicates a sample and hold circuit, and 413 to 416 represent diodes.

The operation is performed as follows. As described in Embodiment 4, the build-up of tar in the machining gap is detected by the calculator 1113 in terms of a difference between the theoretical machining gap resistance and the actually measured machining gap resistance. The build-up of tar in the machining gap makes the discharge operation difficult and the machining status unstable. Hence, tar must be removed when its build-up is detected.

When tar build-up is detected by the calculator 1113, the stop time and the positive polarity voltage application time are increased by the pulse control circuit 1109 to lower the average machining gap voltage to 0V or nearly 0V. By reducing the average voltage, tar is removed.

EMBODIMENT 9

Figure 12:
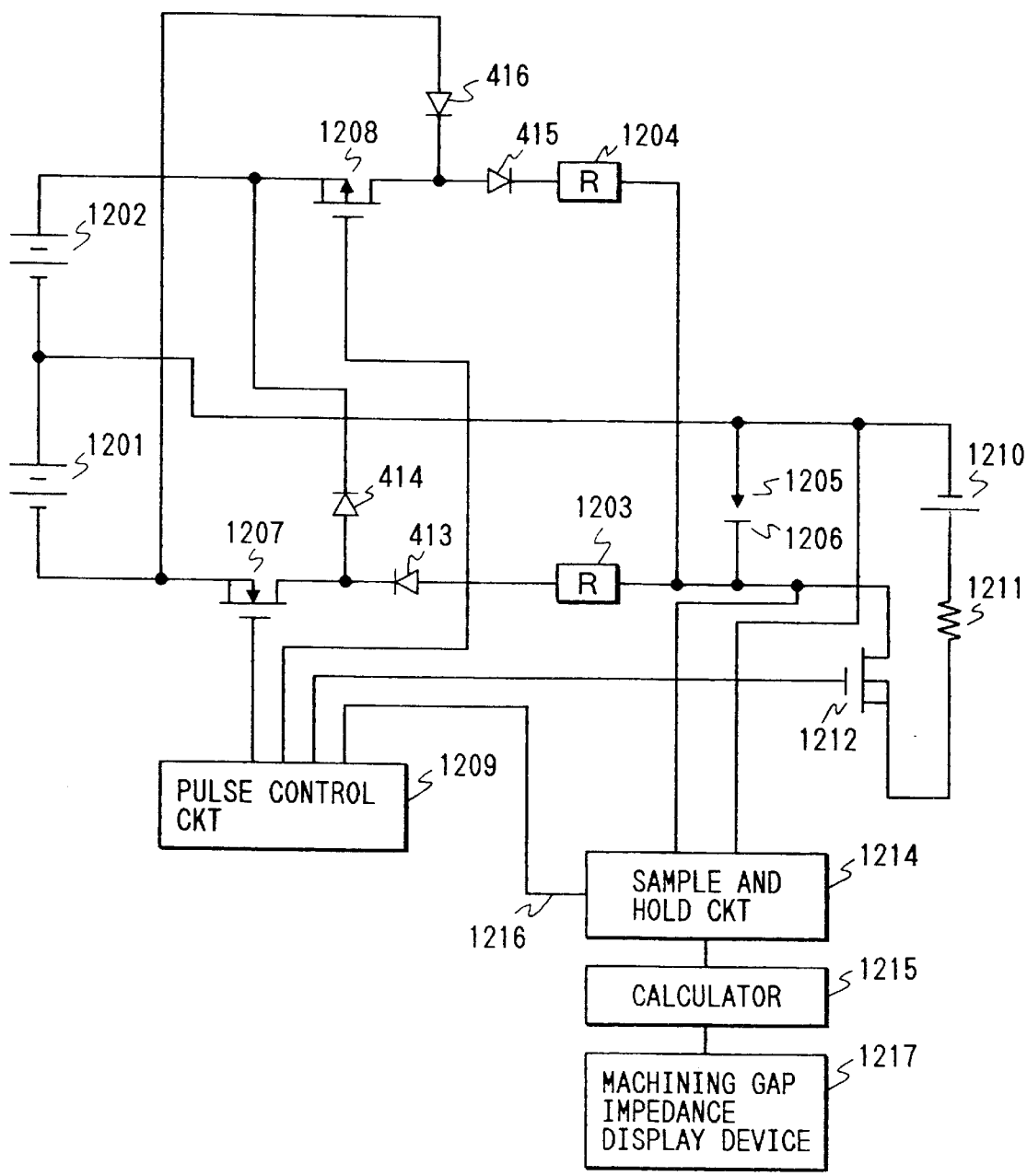
FIG. 12 is a block diagram illustrating a ninth preferred embodiment of the invention.

FIG. 12 is a block diagram showing a ninth embodiment of the invention. It is to be understood that this embodiment is concerned with a modification to Embodiment 7.

In the drawing, 1201 indicates a direct-current power supply (approximately +80V) for opposite polarity (positive electrode, negative workpiece), 1202 denotes a direct-current power supply (approximately −80V) for positive polarity (negative electrode, positive workpiece), 1203 represents an opposite polarity current limit resistor, 1204 designates a positive polarity current limit resistor, 1205 represents an electrode, 1206 designates a workpiece, 1207 indicates an opposite polarity switching device, 1208 denotes a positive polarity switching device, 1209 designates a pulse control circuit, and 1210 indicates a direct-current power supply for machining gap impedance measurement, which is connected to apply a positive polarity voltage to the machining gap. Here, 1211 denotes a resistor, 1212 designates a switching device, 1214 indicates a sample and hold circuit, 1215 denotes a calculator, 1216 represents a sampling signal output from the pulse control circuit 1209 to the sample and hold circuit 1214 when the switching device 1208 is turned on, 1217 indicates a machining gap impedance display device, and 413 to 416 represent diodes.

The operation is performed as follows. Instead of the positive polarity switching device 1208, which is turned on during the stop time of the opposite polarity pulse to apply a negative voltage, the switching device 1212 is turned on at a predetermined pulse or time intervals. The voltage value at this time is sampled and held by the sample and hold circuit 1214 at the timing of the sample signal 1216 output when the switching device 1208 is on. The machining gap impedance is calculated from this measured voltage value, the power supply 1210 voltage, etc. (as calculated in Embodiment 7).

Figure 13:
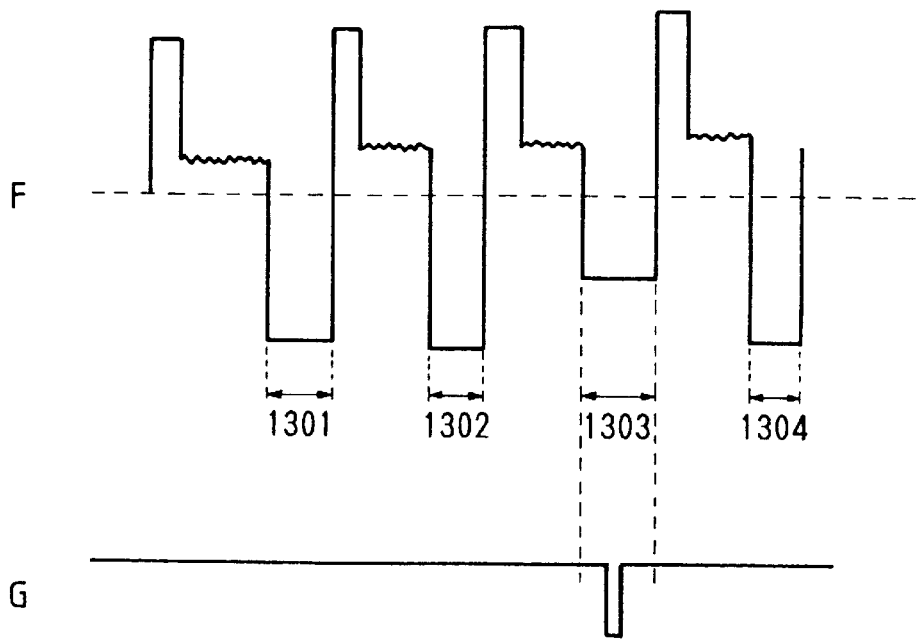
FIG. 13 is a voltage waveform diagram used to show the operation of the ninth preferred embodiment of the invention.

FIG. 13 shows a machining gap voltage waveform and the latch signal 1216 at the time of machining gap impedance measurement in Embodiment 9. In this drawing, F indicates an interelectrode voltage waveform, and G is a latch signal, 1301, 1302 and 1304 indicate that a normal positive polarity voltage is being applied and 1303 indicates that an impedance measuring voltage is being applied. The direct-current power supply 1202 may also be used as the impedance measuring power supply. However, if a discharge has taken place in this case, the measured value of the impedance differs greatly from the actual value. To prevent this disadvantage, the positive polarity power supply 1210, whose voltage is just low enough so that a discharge does not occur at positive polarity, is used in this embodiment.

EMBODIMENT 10

Figure 14:
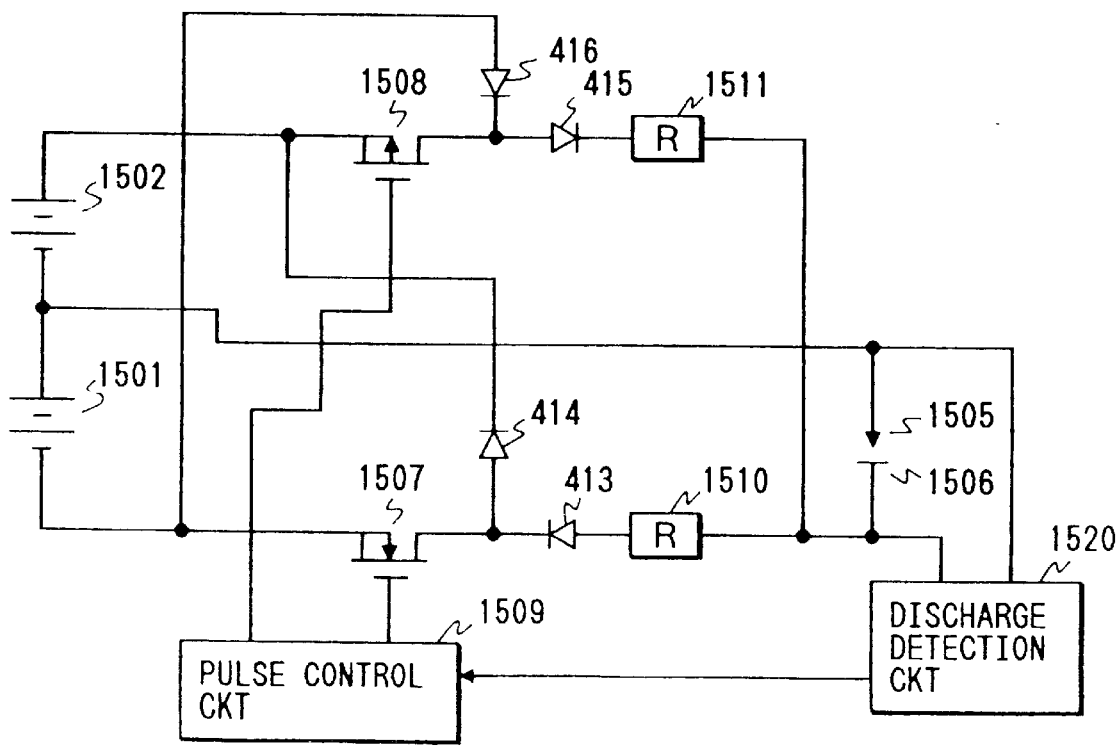
FIG. 14 is a block diagram illustrating a tenth preferred embodiment of the invention.

FIG. 14 is a block diagram showing a tenth embodiment of the invention. In the drawing, 1501 indicates a direct-current power supply for opposite polarity (approximately +80V), 1502 denotes a direct-current power supply for positive polarity (approximately –80V), 1505 represents an electrode, 1506 designates a workpiece, 1507 indicates an opposite polarity switching device, 1508 denotes a positive polarity switching device, 1509 designates a pulse control circuit, 1510 designates an opposite polarity current limit resistor, 1511 denotes a positive polarity current limit resistor, 1520 represents a discharge detection circuit, and 413 to 416 indicate diodes.

Figure 15:
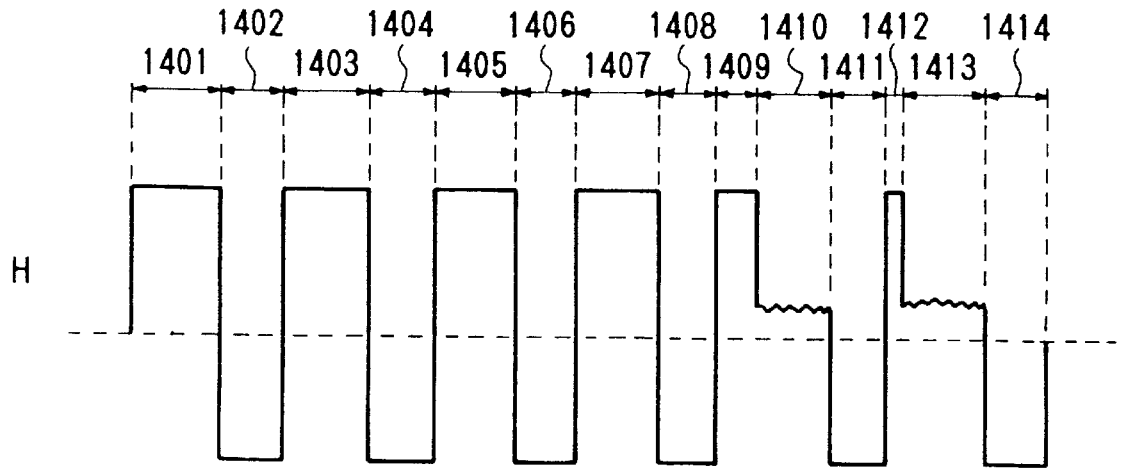
FIG. 15 is a voltage waveform diagram employed to show the operation of the tenth preferred embodiment of the invention.

The operation will be described in accordance with FIG. 15. It is to be understood that FIG. 15 shows a machining gap waveform in Embodiment 10 at a time when no-load time continues. Here, segments 1401, 1403, 1405 and 1407 indicate no-load time periods when a discharge does not occur for a set length of time when a voltage is applied to the machining gap, and 1402, 1404, 1406 and 1408 represent time periods when a discharge is not made but a positive polarity voltage is applied because the no-load time has reached a set time. Segments 1409 and 1412 denote no-load time periods when a discharge takes place before the no-load time reaches a set time. The persistence of a long no-load time does not allow the average voltage of the machining gap to be reduced, leading to the build-up of tar and/or sludge in the machining gap. The termination of no-load time at a given duration allows the average voltage of the machining gap to be lowered. Since the persistence of a long no-load time indicates that the electrode and the workpiece are away from each other, control should be exercised to move them toward each other simultaneously.

For this purpose, the opposite polarity switching device 1507 and the positive polarity switching device 1508 are driven by the pulse control circuit 1509 to apply a voltage between the electrode 1505 and the workpiece 1506, and when an opposite polarity voltage is applied to the machining gap, whether a discharge has occurred in the machining gap is judged by the discharge detection circuit 1502. If a discharge does not take place for a predetermined length of time, the application of the opposite polarity voltage is stopped and a positive polarity voltage is applied to cause the average voltage to reach 0V or nearly 0V. Since this indicates that the electrode 1505 and the workpiece 1506 are away from each other, control is carried out by an NC apparatus (not shown) to move them toward each other.

EMBODIMENT 11

Figure 16:
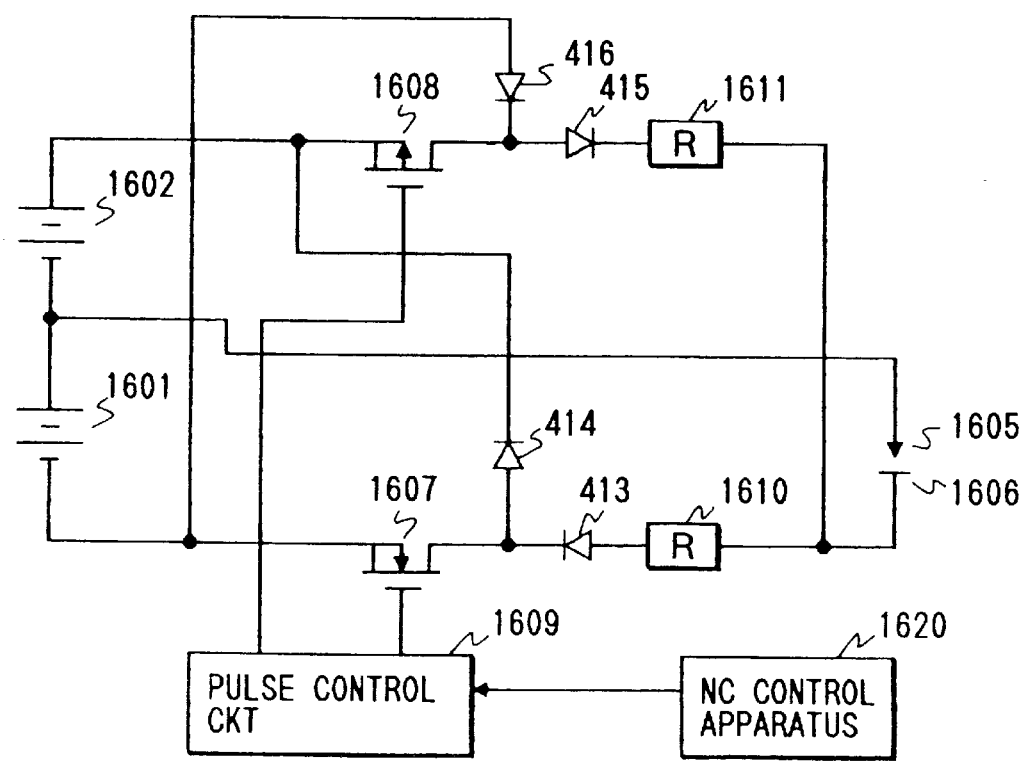
FIG. 16 is a block diagram illustrating an eleventh preferred embodiment of the invention.

FIG. 16 is a block diagram showing an eleventh embodiment of the invention. In the drawing, 1601 indicates a direct-current power supply for opposite polarity (approximately +80V), 1602 denotes a direct-current power supply for positive polarity (approximately –80V), 1605 represents an electrode, 1606 designates a workpiece, 1607 indicates an opposite polarity switching device, 1608 denotes a positive polarity switching device, 1609 designates a pulse control circuit, 1610 designates an opposite polarity current limit resistor, 1611 denotes a positive polarity current limit resistor, 1620 represents an NC control apparatus, and 413 to 416 indicate diodes.

Figure 17:
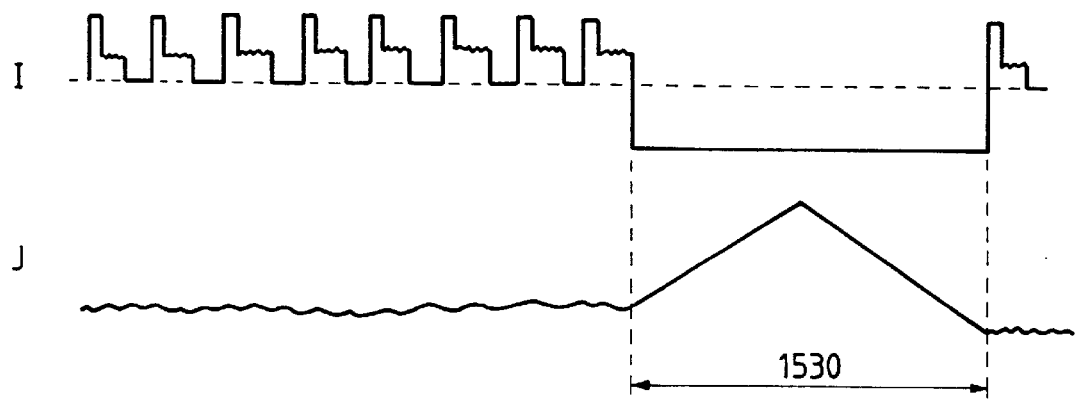
FIG. 17 illustrates a voltage waveform and an electrode position diagram used to show the operation of the eleventh preferred embodiment of the invention.

FIG. 17 shows a voltage waveform concerned with Embodiment 11. In this drawing, I indicates the machining gap voltage waveform, J denotes the electrode position, and 1530 designates a jump operation.

The operation is performed as follows. Generally in an electrical discharge machine, a jump operation, in which the electrode is moved away from the workpiece, is performed periodically by an NC control apparatus. Simultaneously with the jump operation (not shown), a jump operation signal is transmitted to the pulse control circuit 1609. As shown in FIG. 17, the positive polarity switching device 1608 is turned on during a jump 1530 to apply a positive voltage to the machining gap to render the average voltage 0V or nearly 0V.

Since this embodiment is designed to apply a positive polarity voltage to the machining gap to reduce the average voltage during a jump operation in which necessary machining is not performed to remove chips in the electrical discharge machine, high-speed machining is enabled and, at the same time, the build-up of tar on the workpiece and electrode can be suppressed.

EMBODIMENT 12

Figure 18:
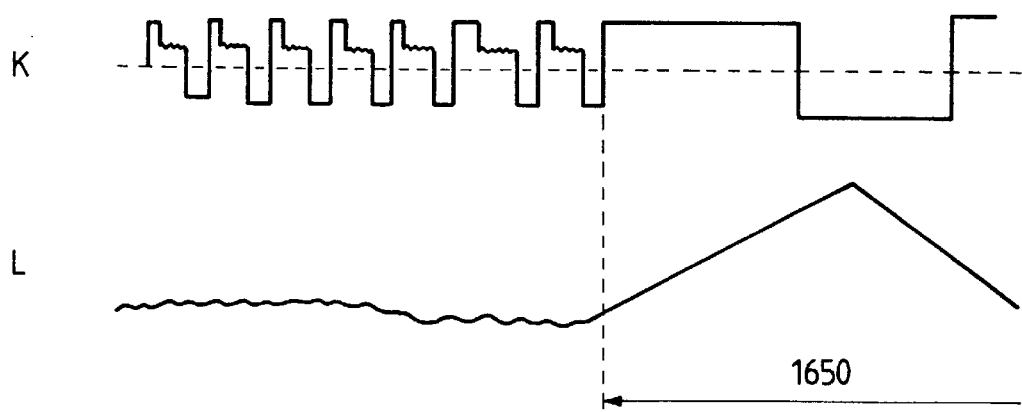
FIG. 18 illustrates a voltage waveform and an electrode position diagram used to show the operation of a twelfth preferred embodiment of the invention.

FIG. 18 is a voltage waveform diagram concerned with a twelfth embodiment of the invention. In this drawing, K indicates a machining gap voltage waveform, L denotes an electrode position, and 1650 designates a jump operation. The arrangement of the present embodiment is identical to the one shown in FIG. 16.

As shown in FIG. 18, as in the eleventh embodiment, an opposite polarity voltage is applied to the machining gap to machine the workpiece, a positive polarity voltage is applied during the stop of the opposite polarity voltage to lower the average voltage, and a jump signal is transmitted to the pulse control circuit 1609 by the NC control apparatus 1620 during the electrode jump operation 1650 to apply a low-frequency voltage to the machining gap.

The application of the low-frequency voltage to the machining gap during the jump 1650 has the effect of aggregate chips. The existence of powder chips of a minimum size (i.e., about 10 microns) in the machining gap achieves a machined surface of finer surface roughness.

EMBODIMENT 13

Figure 19:
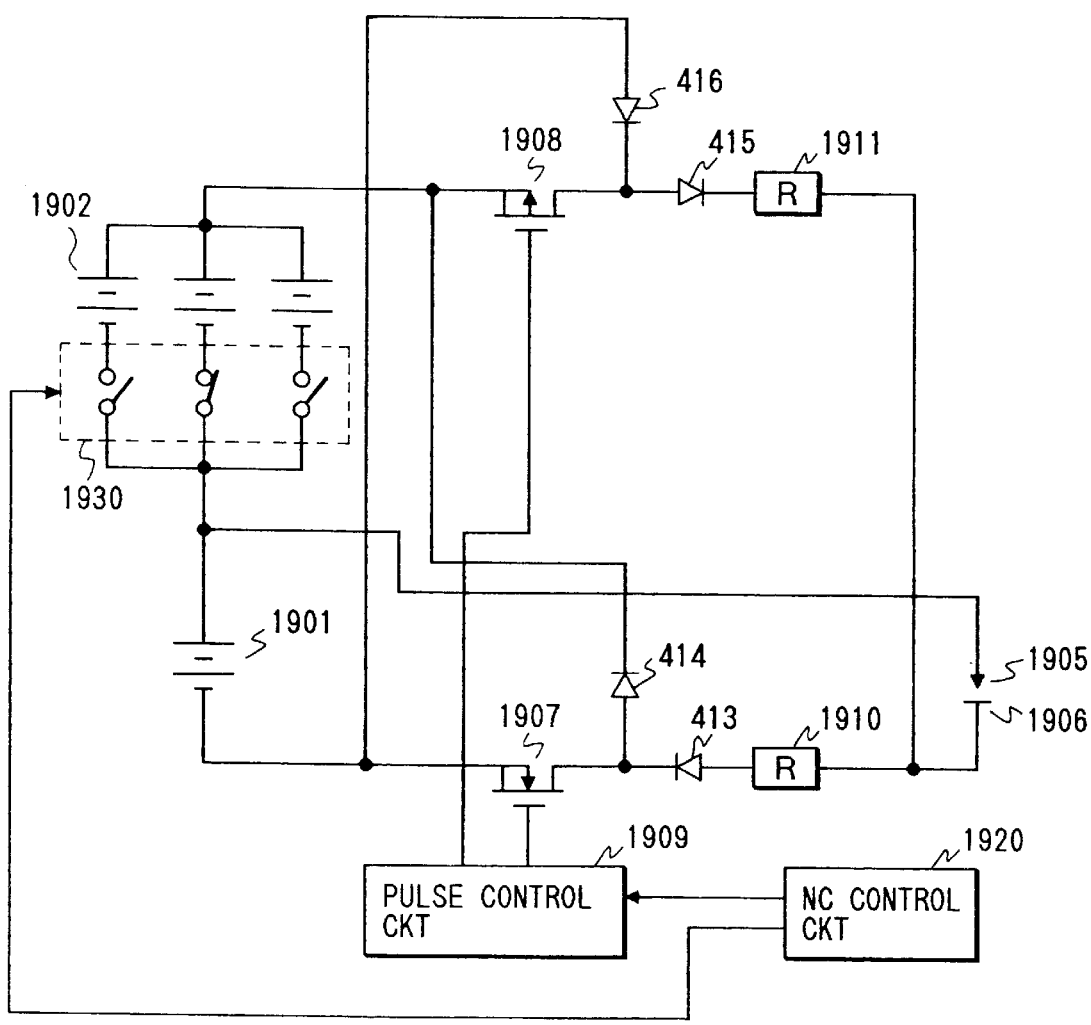
FIG. 19 is a block diagram illustrating a thirteenth preferred embodiment of the invention.

FIG. 19 is an arrangement diagram concerned with a thirteenth embodiment of the invention. The present embodiment is a further modification to Embodiment 11. In FIG. 19, 1901 indicates an opposite polarity direct-current power supply, 1902 designates positive polarity direct-current power supplies, 1905 represents an electrode, 1906 designates a workpiece, 1907 indicates an opposite polarity switching device, 1908 denotes a positive polarity switching device, 1909 designates a pulse control circuit, 1910 designates an opposite polarity current limit resistor, 1911 denotes a positive polarity current limit resistor, 1920 represents an NC control apparatus, 1930 indicates a positive polarity power supply change-over switch, and 413 to 416 designate diodes.

Figure 20:
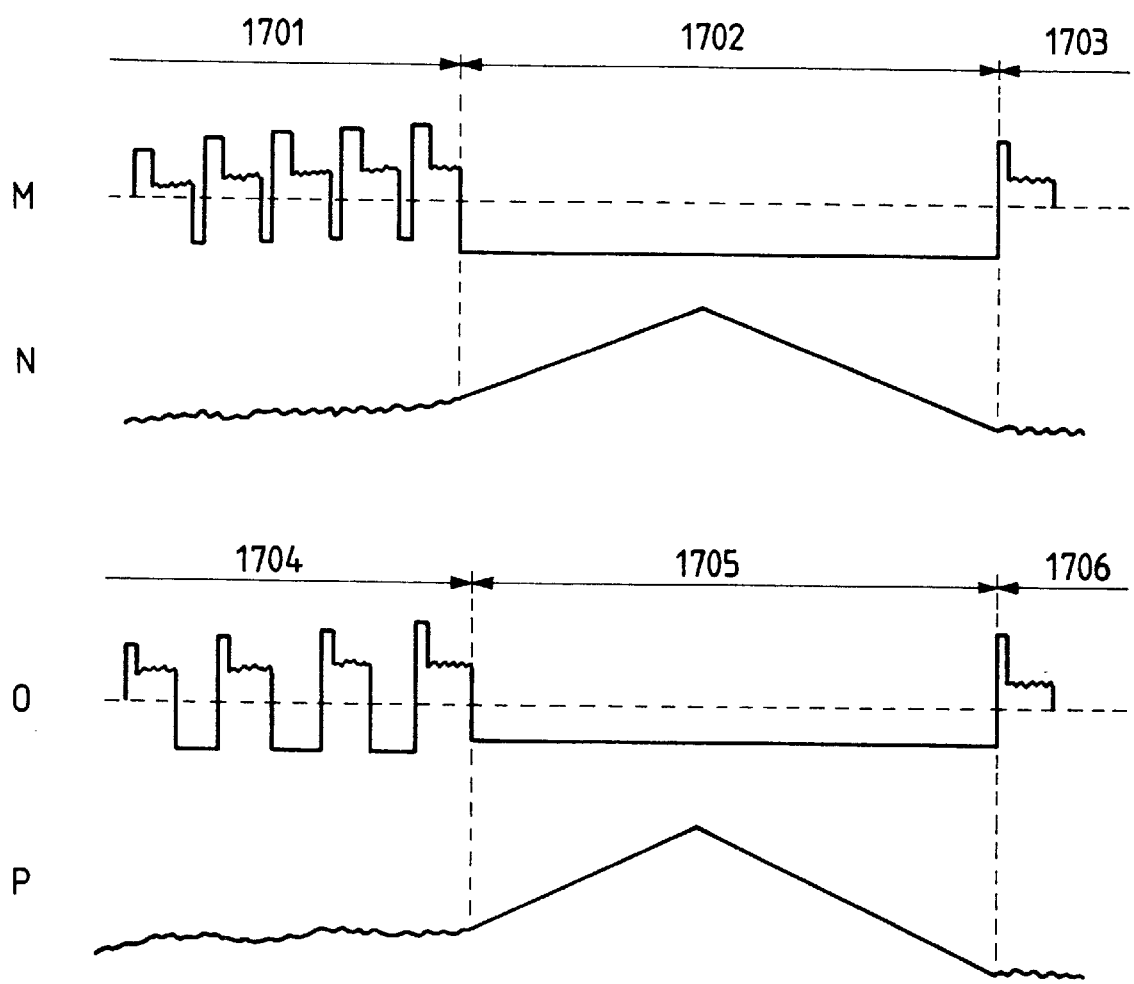
FIG. 20 illustrates a voltage waveform and an electrode position diagram used to show the operation of the thirteenth preferred embodiment of the invention.

FIG. 20 is a voltage waveform diagram relating to Embodiment 13. In this drawing, M indicates a machining gap voltage waveform at a time when machining is carried out during the stop time of an opposite polarity voltage, i.e., under the condition of a short positive polarity voltage application time, and N denotes an electrode position at that time. O designates a machining gap voltage waveform at a time when machining is conducted under the condition of longer stop time than in M, and P represents an electrode position at that time. 1701, 1703, 1704 and 1705 indicate machining, and 1702 and 1705 designate a jump operation.

The operation is performed as follows. When an opposite polarity voltage stop time is set by the NC control apparatus 1920, a signal is output to the positive polarity power supply change-over switch 1930 to select the positive polarity power supply corresponding to the stop time and a predetermined positive polarity voltage is applied to the machining gap during the jump operations 1702, 1705.

Since the average voltage of the machining gap cannot be decreased when machining is performed under the condition of M under which a stop is short, as shown in FIG. 20, the voltage applied during the jump 1702 is increased to render an average voltage 0V or nearly 0V, and since the average voltage of the machining gap can be reduced under the condition of O (where the stop is long), the voltage applied during the jump 1705 is reduced to cause the average voltage to reach 0V or nearly 0V.

EMBODIMENT 14

Figure 21:
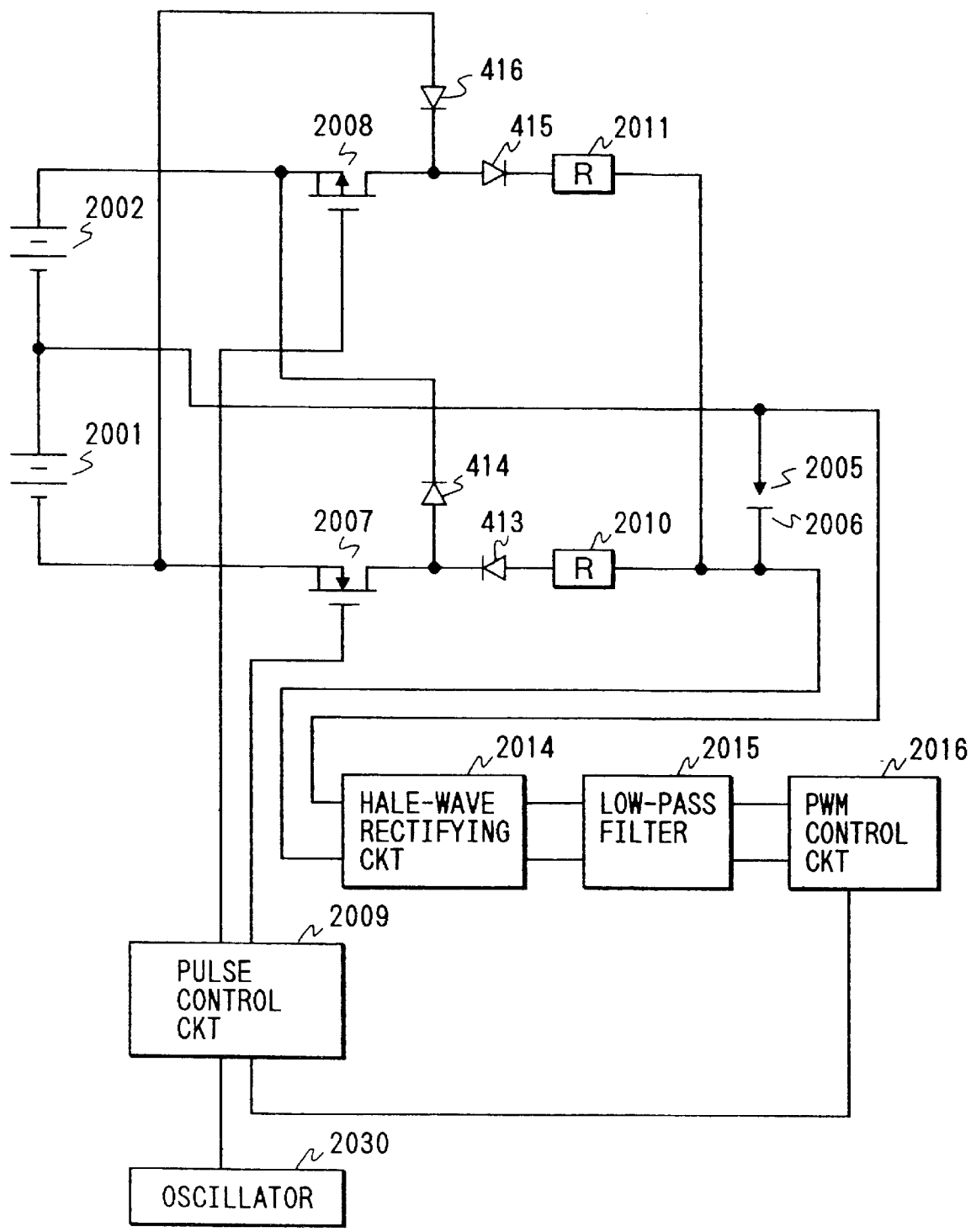
FIG. 21 is a block diagram illustrating a fourteenth preferred embodiment of the invention.

FIG. 21 is an arrangement diagram concerned with a fourteenth embodiment of the invention. In this drawing, 2001 indicates an opposite polarity direct-current power supply, 2002 designates a positive polarity direct-current power supply, 2005 represents an electrode, 2006 designates a workpiece, 2007 indicates an opposite polarity switching device, 2008 denotes a positive polarity switching device, 2009 designates a pulse control circuit, 2010 designates an opposite polarity current limit resistor, 2011 denotes a positive polarity current limit resistor, 2014 represents a half-wave rectifying circuit, 2015 indicates a low-pass filter, 2016 denotes a PWM control circuit, 2030 represents an oscillator, and 413 to 416 designate diodes.

Figure 22:
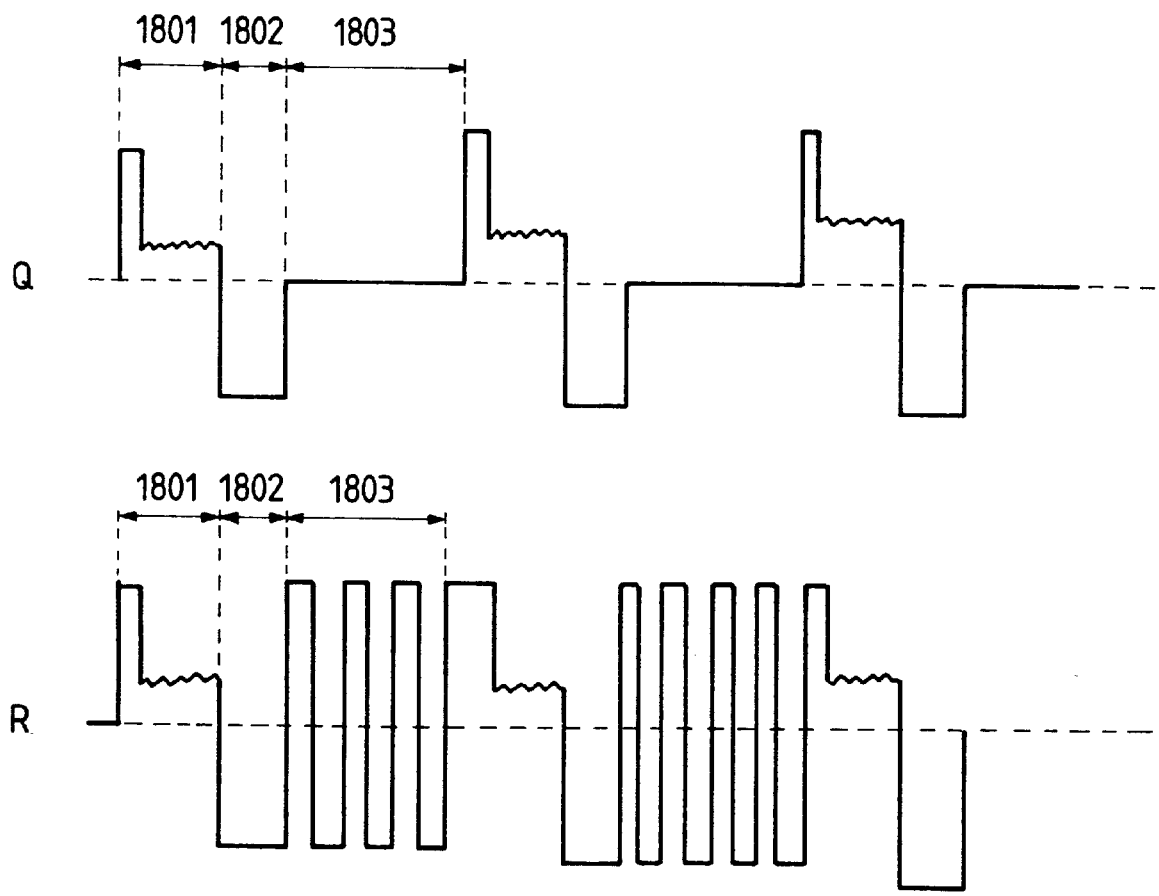
FIG. 22 is a voltage waveform diagram used to show the operation of the fourteenth preferred embodiment of the invention.

The operation will be described in accordance with FIG. 22. FIG. 22 is a voltage waveform diagram relating to Embodiment 14, wherein Q indicates a machining gap voltage waveform of the power supply which applies a positive polarity voltage during the stop time of an opposite polarity pulsed voltage, 1801 designates an opposite polarity voltage application time period and 1802 and 1803 denote opposite polarity voltage stop time periods. The positive polarity voltage is applied during the period 1802, while the voltage of neither polarity is applied during the period 1803. When the opposite polarity voltage stop time is thus increased, an attempt to reduce the average voltage of the machining gap produces a period when the voltage of neither polarity is applied. Therefore, in the electrical discharge machine wherein the average voltage of the machining gap is controlled to 0V by the PWM control described in Embodiment 3, the output of the oscillator 2030 is entered into the pulse control circuit 2009. The pulse control circuit 2009 outputs the control signals of the opposite polarity switching device 2007 and the positive polarity switching device 2008 in order to apply a high-frequency voltage to the machining gap during the time period 1803, which is the opposite polarity voltage stop time and the period when the positive polarity voltage is not applied. It is preferable that the high-frequency voltage is high enough to prevent discharge.

The application of the high-frequency voltage during the time period 1803, which is the opposite polarity voltage stop time and the period when the positive polarity voltage is not applied as described above, agitates the tar and sludge in the machining gap to stabilize machining.

EMBODIMENT 15

In any of the above-referenced Embodiments 3, 5, 6, 7, 8, 10, 11, 12, 13 and 14, the resistance value of the positive polarity voltage current limit resistor may be selected properly to generate a slight discharge at the application of the positive polarity voltage, thereby providing the workpiece with an excellent surface quality. Also, these embodiments may be combined where appropriate, given the teachings of the present invention.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, the present disclosure of the preferred embodiment has been made only by way of example and numerous changes in the details and arrangement of components may be made without departing from the spirit and scope of the invention as hereinafter claimed.

What is claimed is:

1. An electrical discharge machine for applying a pulsed voltage between an electrode and a workpiece opposed via a dielectric fluid to generate a discharge to machine the workpiece with the energy of said discharge, comprising:

a machining pulse control apparatus for applying a second polarity voltage at the stop time of a first polarity pulse voltage; and a misfire pulse detector for detecting an undesired drop in machining gap voltage wherein an applied voltage of the first polarity is between a first voltage and a second voltage, said first voltage being greater in magnitude than the machining gap voltage during said discharge, and said second voltage being greater in magnitude than said first voltage;

the stop time of said first polarity pulse being increased by the machining pulse control apparatus if said misfire pulse detector has detected that the undesired drop in machining gap voltage has occurred.

2. A method for controlling the application of a pulsed voltage to a machining gap formed between an electrode and a workpiece disposed opposite thereto, via an insulating dielectric fluid, to generate a discharge operative to machine the workpiece with the energy of said discharge, the method comprising steps of:

providing a first polarity voltage and a second polarity voltage, opposite to said first polarity voltage, from a power source;

switchably connecting a first current limiting impedance for the second polarity voltage between said workpiece and said power source;

switchably connecting a second current limiting impedance for the first polarity voltage between said workpiece and said power source;

applying the first polarity voltage at a stop time of the second polarity voltage to cause the average voltage to assume a predetermined value during said stop time;

detecting a misfire condition, wherein an applied voltage of the first polarity voltage is between a first value and a second value, said first value having a greater magnitude than a value of a discharge voltage, and said second value having a greater magnitude than said first value; and increasing the stop time of said first polarity pulse if, it is detected in said detecting step that said misfire has occurred.

* * * * *